(12) United States Patent
Hsieh et al.

(10) Patent No.: US 10,007,086 B2
(45) Date of Patent: Jun. 26, 2018

(54) IMAGE CAPTURING OPTICAL LENS ASSEMBLY, IMAGE CAPTURING DEVICE AND ELECTRONIC DEVICE

(71) Applicant: LARGAN PRECISION CO., LTD., Taichung (TW)

(72) Inventors: Tung-Yi Hsieh, Taichung (TW); Hsuan-Chin Huang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 157 days.

(21) Appl. No.: 15/045,344

(22) Filed: Feb. 17, 2016

(65) Prior Publication Data
US 2017/0192200 A1 Jul. 6, 2017

(30) Foreign Application Priority Data

Dec. 31, 2015 (TW) .............................. 104144707 A

(51) Int. Cl.
| G02B 9/00 | (2006.01) |
| G02B 9/64 | (2006.01) |
| G02B 27/00 | (2006.01) |
| G02B 13/00 | (2006.01) |

(52) U.S. Cl.
CPC ............ G02B 9/64 (2013.01); G02B 13/0045 (2013.01); G02B 27/0025 (2013.01); G02B 27/0081 (2013.01)

(58) Field of Classification Search
CPC .......... G02B 9/00; G02B 9/64; G02B 13/001; G02B 13/002; G02B 13/0045; G02B 15/161
USPC ....................... 359/749, 750, 754, 793–795
See application file for complete search history.

(56) References Cited

U.S. PATENT DOCUMENTS

| 4,037,934 A | 7/1977 | Matsubara |
| 5,087,989 A | 2/1992 | Igarashi |
| 5,198,931 A | 3/1993 | Igarashi |
| 5,633,736 A | 5/1997 | Griffith et al. |
| 7,057,804 B2 | 6/2006 | Tada et al. |

FOREIGN PATENT DOCUMENTS

| JP | H01-123208 A | 5/1989 |
| JP | H04-055807 A | 2/1992 |
| JP | H11-174338 A | 7/1999 |
| JP | 2005-091440 A | 4/2005 |

*Primary Examiner* — Robert E Tallman
(74) *Attorney, Agent, or Firm* — McClure, Qualey & Rodack, LLP

(57) ABSTRACT

An image capturing optical lens assembly includes, in order from an object side to an image side, a front lens group, an aperture stop and a rear lens group. The front lens group includes at least two lens elements, wherein one lens element closest to an imaged object of the at least two lens elements has negative refractive power and an image-side surface being concave. The rear lens group includes at least four lens elements, wherein one lens element closest to an image surface of the at least four lens elements has an image-side surface being concave. The image capturing optical lens assembly has a total of eight lens elements.

26 Claims, 17 Drawing Sheets

IMAGE CAPTURING OPTICAL LENS ASSEMBLY, IMAGE CAPTURING DEVICE AND ELECTRONIC DEVICE

RELATED APPLICATIONS

This application claims priority to Taiwan Application Serial Number 104144707, filed Dec. 31, 2015, which is herein incorporated by reference.

BACKGROUND

Technical Field

The present disclosure relates to an image capturing optical lens assembly and an image capturing device. More particularly, the present disclosure relates to an image capturing optical lens assembly and an image capturing device with a wide field of view applicable to electronic devices.

Description of Related Art

In recent years, with the popularity of various camera applications with different functionalities, many products, such as household appliances, game consoles, monitors, vehicles, electronic products and mobile devices, are equipped with optical lens assemblies, which are suitable for visual assistances, image identifications and motion detections. Some of the products are required with wider field of view, and even required to be operated in low light environments, such as night surveillance or automobile cameras. However, for conventional optical lens assemblies, it is hard to obtain both large field of view and a large aperture, which would result in insufficient image capturing range or reduced resolution power under low light environments.

SUMMARY

According to one aspect of the present disclosure, an image capturing optical lens assembly includes, in order from an object side to an image side, a front lens group, an aperture stop and a rear lens group. The front lens group includes at least two lens elements, wherein one lens element closest to an imaged object of the at least two lens elements has negative refractive power and an image-side surface being concave. The rear lens group includes at least four lens elements, wherein one lens element closest to an image surface of the at least four lens elements has an image-side surface being concave. The image capturing optical lens assembly has a total of eight lens elements. When an axial distance between an object-side surface of the lens element closest to the imaged object and the image-side surface of the lens element closest to the image surface is Td, a sum of axial distances between every two of the lens elements of the image capturing optical lens assembly that are adjacent to each other is $\Sigma AT$, an effective radius of the image-side surface of the lens element closest to the image surface is Yi, a maximal image height of the image capturing optical lens assembly is ImgH, a curvature radius of the object-side surface of the lens element closest to the imaged object is R1, a curvature radius of an image-side surface of the lens element closest to the imaged object is R2, a curvature radius of the image-side surface of the lens element closest to the image surface is Ri, and a focal length of the image capturing optical lens assembly is f, the following conditions are satisfied:

$5.0 < Td/\Sigma AT$;

$|Yi/ImgH| < 2.0$;

$1.5 < |R1|/R2$, and $0 < Ri/f < 10$.

According to another aspect of the present disclosure, an image capturing device includes the image capturing optical lens assembly of the aforementioned aspect and an image sensor, wherein the image sensor is disposed on the image surface of the image capturing optical lens assembly.

According to yet another aspect of the present disclosure, an electronic device includes the image capturing device of the aforementioned aspect.

According to further another aspect of the present disclosure, an image capturing optical lens assembly comprising, in order from an object side to an image side, a front lens group, an aperture stop and a rear lens group. The front lens group includes at least two lens elements, wherein one lens element closest to an imaged object of the at least two lens elements has negative refractive power and an image-side surface being concave. The rear lens group includes at least four lens elements, wherein one lens element closest to an image surface of the at least four lens elements has an object-side surface being convex and an image-side surface being concave. The image capturing optical lens assembly has a total of eight lens elements. When an axial distance between an object-side surface of the lens element closest to the imaged object and the image-side surface of the lens element closest to the image surface is Td, a sum of axial distances between every two of the lens elements of the image capturing optical lens assembly that are adjacent to each other is $\Sigma AT$, an effective radius of the image-side surface of the lens element closest to the image surface is Yi, a maximal image height of the image capturing optical lens assembly is ImgH, a curvature radius of the object-side surface of the lens element closest to the imaged object is R1, and a curvature radius of an image-side surface of the lens element closest to the imaged object is R2, the following conditions are satisfied:

$5.0 < Td/\Sigma AT$;

$|Yi/ImgH| < 2.0$; and $1.5 < |R1|/R2$.

According to still another aspect of the present disclosure, an image capturing device includes the image capturing optical lens assembly of the aforementioned aspect and an image sensor, wherein the image sensor is disposed on the image surface of the image capturing optical lens assembly.

According to yet another aspect of the present disclosure, an electronic device includes the image capturing device of the aforementioned aspect.

DETAILED DESCRIPTION

Figure 1:
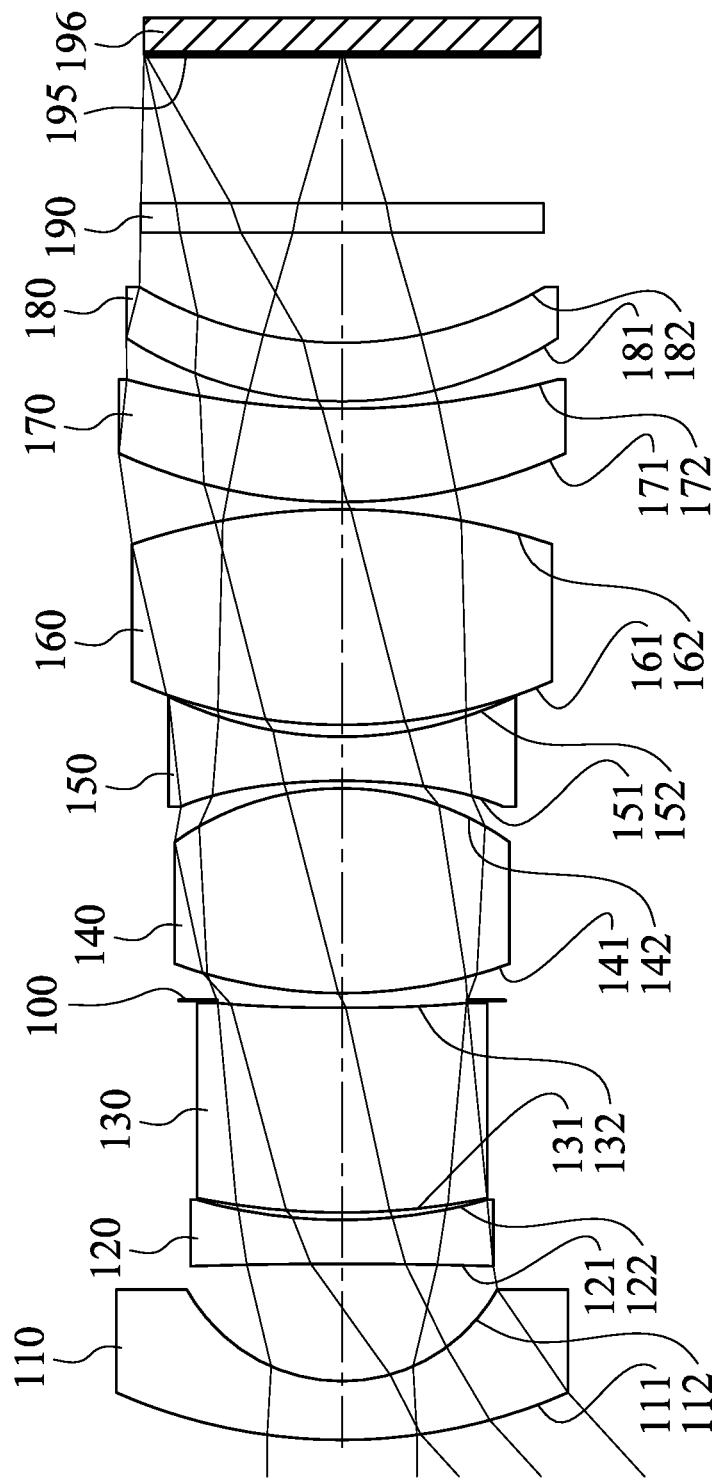
FIG. 1 is a schematic view of an image capturing device according to the 1st embodiment of the present disclosure.

An image capturing optical lens assembly includes, in order from an object side to an image side, a front lens group, an aperture stop and a rear lens group, wherein the image capturing optical lens assembly has a total of eight lens elements.

The front lens group includes at least two lens elements, wherein one lens element closest to an imaged object of the at least two lens elements has negative refractive power and an image-side surface being concave. Therefore, it is favorable for convergence of the off-axial light with larger field of view on the image surface, and for reducing the back focal length of the image capturing optical lens assembly by the surface shape design so as to control the total track length thereof.

The rear lens group includes at least four lens elements, wherein one lens element closest to an image surface of the at least four lens elements can have an object-side surface being convex and has an image-side surface being concave. Therefore, it is favorable for convergence of the off-axial light on the image surface, and for reducing the back focal length of the image capturing optical lens assembly by the surface shape design so as to control the total track length thereof. Further, a number of the lens elements having negative refractive power of the rear lens group can be one. Therefore, the rear lens group can provide the ability of light convergence so as to obtain the balance between the proper total track length and the high image quality.

Preferably, the front lens group can have a total of three lens elements, and the rear lens group can have a total of five lens elements. Therefore, the aperture stop can be disposed at a proper position, so that the aperture stop would not be disposed too close to the imaged object for causing the field of view being too small, or too close to the image surface for causing the excessive chief ray angle (CRA).

More preferably, the lens elements of the front lens group can includes, in order from the object side to the image side, a first lens element with negative refractive power, a second lens element with negative refractive power and a third lens element with positive refractive power, and the lens elements of the rear lens group can includes, in order from the object side to the image side, a fourth lens element with positive refractive power, a fifth lens element with negative refractive power, a sixth lens element with positive refractive power, a seventh lens element with positive refractive power and an eighth lens element. Therefore, it is favorable for enlarging the field of view so as to obtain the sufficient image capturing range.

When an axial distance between an object-side surface of the lens element closest to the imaged object and the image-side surface of the lens element closest to the image surface is Td, and a sum of axial distances between every two of the lens elements of the image capturing optical lens assembly that are adjacent to each other is $\Sigma AT$, the following condition is satisfied: $5.0 < Td/\Sigma AT$. Therefore, the lens spacing of the image capturing optical lens assembly can be fully utilized so as to reduce the complexity and difficulty for assembling. Preferably, the following condition can be satisfied: $5.25 < Td/\Sigma AT < 10$.

When an effective radius of the image-side surface of the lens element closest to the image surface is Yi, and a maximal image height of the image capturing optical lens assembly is ImgH, the following condition is satisfied: $|Yi/ImgH| < 2.0$. Therefore, it is favorable for enhancing the ability of image identification and resolution under the low light environment by providing sufficient relative illumination in the off-axial region of the image.

When a curvature radius of the object-side surface of the lens element closest to the imaged object is R1, and a curvature radius of an image-side surface of the lens element closest to the imaged object is R2, the following condition is satisfied: $1.5 < |R1|/R2$. Therefore, it is favorable for enlarging the field of view, and allowing the entry of the off-axial incident light in the image capturing optical lens assembly.

When a curvature radius of the image-side surface of the lens element closest to the image surface is Ri, and a focal length of the image capturing optical lens assembly is f, the following condition is satisfied: $0 < Ri/f < 10$. Therefore, it is favorable for shortening the back focal length, reducing the angle of the incident light on the image surface, and enhancing the resolving power at the off-axial region of the image. Preferably, the following condition can be satisfied: $0.5 < Ri/f < 5.0$.

When the focal length of the image capturing optical lens assembly is f, and a focal length of the lens element closest to the image surface is fi, the following condition is satisfied: $|f/fi| < 0.30$, wherein the lens element closest to the image surface can have positive refractive power or negative refractive power. Therefore, the lens element closest to the image surface can provide proper aberration corrections.

When the axial distance between the object-side surface of the lens element closest to the imaged object and the image-side surface of the lens element closest to the image surface is Td, and an axial distance between the image-side surface of the lens element closest to the image surface and the image surface is BL, the following condition is satisfied: $3.0 < Td/BL < 10$. Therefore, it is favorable for obtaining the compact arrangement of the image capturing optical lens assembly from the proper total track length and the proper back focal length.

When a maximal field of view of the image capturing optical lens assembly is FOV, the following condition is satisfied: 80 degrees<FOV. Therefore, it is favorable for boosting the advantage of large field of view of the image capturing optical lens assembly.

When an f-number of the image capturing optical lens assembly is Fno, the following condition is satisfied: Fno<2.40. Therefore, it is favorable for the large aperture arrangement.

At least one lens element of the front lens group has an Abbe number smaller than 25, and at least one lens element of the rear lens group has an Abbe number smaller than 25. Therefore, it is favorable for enhancing the image quality by correcting the chromatic aberration.

At least one lens element of the front lens group has a refractive index greater than 1.90, and at least one lens element of the rear lens group has a refractive index greater than 1.90. Therefore it is favorable for enhancing the image quality by correcting the aberrations.

When the focal length of the image capturing optical lens assembly is f, a focal length of a lens element closest to the aperture stop of the front lens group is fs1, and a focal length of a lens element closest to the aperture stop of the rear lens group is fs2, the following condition is satisfied: $0.80<(f/fs1)+(f/fs2)<2.0$. Therefore, it is favorable for balancing the arrangement of refractive power between the front lens group and the rear lens group.

When an axial distance between two lens elements of the image capturing optical lens assembly which are closest to the imaged object is T12, and the sum of axial distances between every two of the lens elements of the image capturing optical lens assembly that are adjacent to each other is $\Sigma AT$, the following condition is satisfied: $0.50<T12/\Sigma AT<0.85$. Therefore, it is favorable for ensuring the compactness of the lens elements of the rear lens group so as to improve the lens assembling process.

When the focal length of the lens element closest to the image surface is fi, |fi| is a largest focal length in absolute value of the lens elements of the image capturing optical lens assembly. Therefore, it is favorable for enhancing the effect of the aberration correction so as to improving the image quality.

When the maximal image height of the image capturing optical lens assembly is ImgH, and an entrance pupil diameter of the image capturing optical lens assembly is EPD, and the following condition is satisfied: $0.80<ImgH/EPD<2.40$. Therefore, the sufficient image brightness can be provided.

According to the image capturing optical lens assembly of the present disclosure, the lens elements thereof can be made of glass or plastic materials. When the lens elements are made of glass materials, the distribution of the refractive power of the image capturing optical lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing optical lens assembly. Therefore, the total track length of the image capturing optical lens assembly can also be reduced.

According to the image capturing optical lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the image capturing optical lens assembly of the present disclosure, the refractive power or the focal length of a lens element being positive or negative may refer to the refractive power or the focal length in a paraxial region of the lens element.

According to the image capturing optical lens assembly of the present disclosure, the image capturing optical lens assembly can include at least one stop, such as an aperture stop, a glare stop or a field stop. Said glare stop or said field stop is for eliminating the stray light and thereby improving the image resolution thereof.

According to the image capturing optical lens assembly of the present disclosure, the image surface of the image capturing optical lens assembly, based on the corresponding image sensor, can be flat or curved. In particular, the image surface can be a curved surface being concave facing towards the object side.

According to the image capturing optical lens assembly of the present disclosure, an aperture stop can be configured as a middle stop. A middle stop disposed between the first lens element and the image surface is favorable for enlarging the field of view of the image capturing optical lens assembly and thereby provides a wider field of view for the same.

According to the image capturing optical lens assembly of the present disclosure, the image capturing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned image capturing optical lens assembly and an image sensor, wherein the image sensor is disposed on the image side of the aforementioned image capturing optical lens assembly, that is, the image sensor can be disposed on or near the image surface of the aforementioned image capturing optical lens assembly. By the arrangement of the aforementioned image capturing optical lens assembly, the lens which is closest to an imaged object has negative refractive power and has an image-side surface being concave, so that the off-axial incident light with large field of view can be retrieved in the image capturing optical lens assembly so as to obtain the sufficient image capturing range, and the lens element which is closer to the image surface can converge the off-axial incident light on the image surface. The lens element closest to the image surface has an image-side surface being concave, so that it is favorable for restraining the back focal length of the image capturing optical lens assembly by the surface shape design so as to control the total track length thereof. Furthermore, the arrangement of lens elements in the image capturing optical lens assembly, the image capturing device and an electronic device is favorable for obtaining better image quality with a large aperture arrangement, and also controlling the volume and total track length thereof. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-10th specific embodiments are provided for further explanation.

1st Embodiment

Figure 2:
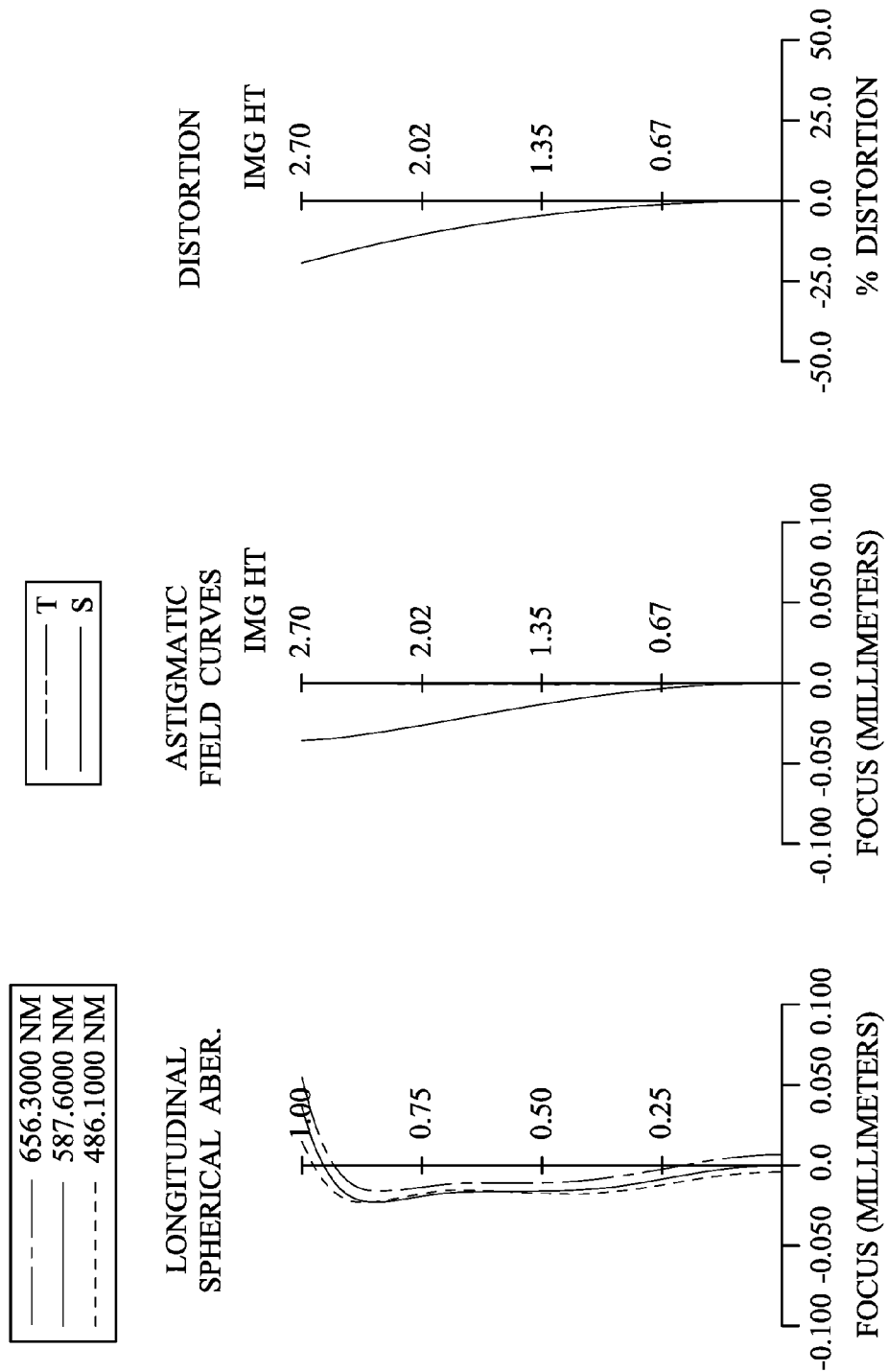
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an image capturing optical lens assembly (its reference numeral is omitted) and an image sensor 196. The image capturing optical lens assembly includes, in order from an object side to an image side, a front lens group (its reference numeral is omitted), an aperture stop 100, a rear lens group (its reference numeral is omitted), a filter 190 and an image surface 195, wherein the image sensor 196 is disposed on the image surface 195 of the image capturing optical lens assembly, and the image capturing optical lens assembly has a total of eight lens elements. In detail, the front lens group has a total of three lens elements, in order from the object side to the image side, a first lens element 110, a second lens element 120 and a third lens element 130, and the rear lens group has a total of five lens elements, in order from the object side to the image side, a fourth lens element 140, a fifth lens element 150, a sixth lens element 160, a seventh lens element 170 and an eighth lens element 180.

The first lens element 110 with negative refractive power has an object-side surface 111 being convex and an image-side surface 112 being concave. The first lens element 110 is made of a glass material, and has the object-side surface 111 and the image-side surface 112 being both spherical.

The second lens element 120 with negative refractive power has an object-side surface 121 being concave and an image-side surface 122 being concave. The second lens element 120 is made of a glass material, and has the object-side surface 121 and the image-side surface 122 being both spherical.

The third lens element 130 with positive refractive power has an object-side surface 131 being convex and an image-side surface 132 being concave. The third lens element 130 is made of a glass material, and has the object-side surface 131 and the image-side surface 132 being both aspheric.

The fourth lens element 140 with positive refractive power has an object-side surface 141 being convex and an image-side surface 142 being convex. The fourth lens element 140 is made of a glass material, and has the object-side surface 141 and the image-side surface 142 being both spherical.

The fifth lens element 150 with negative refractive power has an object-side surface 151 being concave and an image-side surface 152 being concave. The fifth lens element 150 is made of a glass material, and has the object-side surface 151 and the image-side surface 152 being both aspheric.

The sixth lens element 160 with positive refractive power has an object-side surface 161 being convex and an image-side surface 162 being convex. The sixth lens element 160 is made of a glass material, and has the object-side surface 161 and the image-side surface 162 being both spherical.

The seventh lens element 170 with positive refractive power has an object-side surface 171 being convex and an image-side surface 172 being concave. The seventh lens element 170 is made of a glass material, and has the object-side surface 171 and the image-side surface 172 being both spherical.

The eighth lens element 180 with positive refractive power has an object-side surface 181 being convex and an image-side surface 182 being concave. The eighth lens element 180 is made of a glass material, and has the object-side surface 181 and the image-side surface 182 being both spherical.

The filter 190 is made of a glass material and located between the eighth lens element 180 and the image surface 195, and will not affect the focal length of the image capturing optical lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing optical lens assembly according to the 1st embodiment, when a focal length of the image capturing optical lens assembly is f, an f-number of the image capturing optical lens assembly is Fno, and half of a maximal field of view of the image capturing optical lens assembly is HFOV, these parameters have the following values: f=3.67 mm; Fno=1.80; and HFOV=42.4 degrees.

In the image capturing optical lens assembly according to the 1st embodiment, when the maximal field of view of the image capturing optical lens assembly is FOV, the following condition is satisfied: FOV=84.8 degrees.

In the image capturing optical lens assembly according to the 1st embodiment, when a maximal image height of the image capturing optical lens assembly is ImgH (half of a diagonal length of an effective photosensitive area of the image sensor 196), and an entrance pupil diameter of the image capturing optical lens assembly is EPD, the following condition is satisfied: ImgH/EPD=1.32.

In the image capturing optical lens assembly according to the 1st embodiment, when an effective radius of the image-side surface of the lens element closest to the image surface 195 (that is, the image-side surface 182 of the eighth lens element 180 according to the 1st embodiment) is Yi, and the maximal image height of the image capturing optical lens assembly is ImgH, the following condition is satisfied: |Yi/ImgH|=1.02.

In the image capturing optical lens assembly according to the 1st embodiment, when an axial distance between two lens elements of the image capturing optical lens assembly which are closest to the imaged object (the first lens element 110 and the second lens element 120 according to the 1st embodiment) is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, an axial distance between the seventh lens element 170 and the eighth lens element 180 is T78, and a sum of axial distances between every two of the lens elements of the image capturing optical lens assembly that are adjacent to each other is ΣAT (ΣAT=T12+T23+T34+T45+T56+T67+T78), the following condition is satisfied: T12/ΣAT=0.68.

In the image capturing optical lens assembly according to the 1st embodiment, when an axial distance between the object-side surface of the lens element closest to the imaged object (that is, the object-side surface 111 of the first lens element 110 according to the 1st embodiment) and the image-side surface of the lens element closest to the image surface (that is, the image-side surface 182 of the eighth lens element 180 according to the 1st embodiment) is Td, and the sum of axial distances between every two of the lens elements of the image capturing optical lens assembly that are adjacent to each other is ΣAT (ΣAT=T12+T23+T34+T45+T56+T67+T78), the following condition is satisfied: Td/ΣAT=6.32.

In the image capturing optical lens assembly according to the 1st embodiment, when the axial distance between the object-side surface of the lens element closest to the imaged object (that is, the object-side surface 111 of the first lens element 110 according to the 1st embodiment) and the image-side surface of the lens element closest to the image surface (that is, the image-side surface 182 of the eighth lens element 180 according to the 1st embodiment) is Td, and an axial distance between the image-side surface of the lens element closest to the image surface 195 (that is, the image-side surface 182 of the eighth lens element 180 according to the 1st embodiment) and the image surface 195 is BL, the following condition is satisfied: Td/BL=3.81.

In the image capturing optical lens assembly according to the 1st embodiment, when a curvature radius of the object-side surface of the lens element closest to the imaged object (that is, the object-side surface 111 of the first lens element 110 according to the 1st embodiment) is R1, and a curvature radius of an image-side surface of the lens element closest to the imaged object (that is, the image-side surface 112 of the first lens element 110 according to the 1st embodiment) is R2, the following condition is satisfied: |R1|/R2=3.18.

In the image capturing optical lens assembly according to the 1st embodiment, when a curvature radius of the image-side surface of the lens element closest to the image surface (that is, the image-side surface 182 of the eighth lens element 180 according to the 1st embodiment) is Ri, and the focal length of the image capturing optical lens assembly is f, the following condition is satisfied: Ri/f=1.47.

In the image capturing optical lens assembly according to the 1st embodiment, when the focal length of the image capturing optical lens assembly is f, a focal length of a lens element closest to the aperture stop 100 of the front lens group is fs1 (that is, the lens element closest to the aperture stop 100 of the front lens group is the third lens element 130 according to the 1st embodiment), and a focal length of a lens element closest to the aperture stop 100 of the rear lens group is fs2 (that is, the lens element closest to the aperture stop 100 of the rear lens group is the fourth lens element 140 according to the 1st embodiment), the following condition is satisfied: (f/fs1)+(f/fs2)=1.33.

In the image capturing optical lens assembly according to the 1st embodiment, when the focal length of the image capturing optical lens assembly is f, and a focal length of the lens element closest to the image surface 195 (that is, the eighth lens element 180 according to the 1st embodiment) is fi, the following condition is satisfied: |f/fi|=0.03.

The detailed optical data of the 1st embodiment are shown in Table 1 and the aspheric surface data are shown in Table 2 below.

TABLE 1

1st Embodiment
f = 3.67 mm, Fno = 1.80, HFOV = 42.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 7.669 | 0.800 | Glass | 1.729 | 54.7 | −5.16 |
| 2 | | 2.413 | 1.602 | | | | |
| 3 | Lens 2 | −65.926 | 0.600 | Glass | 1.603 | 38.0 | −10.83 |
| 4 | | 7.278 | 0.100 | | | | |
| 5 | Lens 3 | 10.091 ASP | 2.793 | Glass | 2.144 | 17.8 | 12.31 |
| 6 | | 30.373 ASP | 0.100 | | | | |
| 7 | Ape. Stop | Plano | 0.100 | | | | |
| 8 | Lens 4 | 6.680 | 2.795 | Glass | 1.786 | 44.2 | 3.56 |
| 9 | | −3.920 | 0.103 | | | | |
| 10 | Lens 5 | −8.765 ASP | 0.600 | Glass | 1.844 | 24.8 | −3.81 |
| 11 | | 5.247 ASP | 0.162 | | | | |
| 12 | Lens 6 | 7.165 | 2.941 | Glass | 1.729 | 54.7 | 5.87 |
| 13 | | −8.809 | 0.100 | | | | |
| 14 | Lens 7 | 7.308 | 1.273 | Glass | 1.729 | 54.7 | 25.96 |
| 15 | | 11.029 | 0.100 | | | | |
| 16 | Lens 8 | 5.445 | 0.800 | Glass | 1.729 | 54.7 | 142.45 |
| 17 | | 5.390 | 1.500 | | | | |
| 18 | Filter | Plano | 0.400 | Glass | 1.517 | 64.2 | — |
| 19 | | Plano | 2.034 | | | | |
| 20 | Image | Plano | — | | | | |

Reference wavelength is 587.6 nm (d-line).
Effective radius of surface 8 is 1.900 mm.

TABLE 2

| Aspheric Coefficients | | | | |
|---|---|---|---|---|
| Surface # | 5 | 6 | 10 | 11 |
| k = | 8.1166E−01 | 5.5467E+01 | 1.4925E+00 | 8.4227E−01 |
| A4 = | 1.5899E−04 | 1.0212E−03 | −1.1629E−03 | −3.5904E−04 |
| A6 = | −6.9243E−05 | 5.3267E−04 | −2.8426E−04 | −2.1883E−04 |
| A8 = | 3.4945E−05 | −1.4216E−04 | −1.1330E−05 | −3.2271E−07 |
| A10 = | −5.2221E−06 | 2.2537E−05 | 5.5461E−06 | 1.4112E−06 |
| A12 = | | 3.2813E−06 | −1.2435E−06 | −1.5844E−07 |

In Table 1, the curvature radius, the thickness and the focal length are shown in millimeters (mm). Surface numbers 0-20 represent the surfaces sequentially arranged from the object side to the image side along the optical axis. In Table 2, k represents the conic coefficient of the equation of the aspheric surface profiles. A4-A12 represent the aspheric coefficients ranging from the 4th order to the 12th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Moreover, according to the 1st embodiment, at least one lens element of the front lens group has an Abbe number smaller than 25, that is, the third lens element 130; at least one lens element of the rear lens group has an Abbe number smaller than 25, that is, the fifth lens element 150. At least one lens element of the front lens group has a refractive index greater than 1.90, that is, the third lens element 130.

2nd Embodiment

Figure 3:
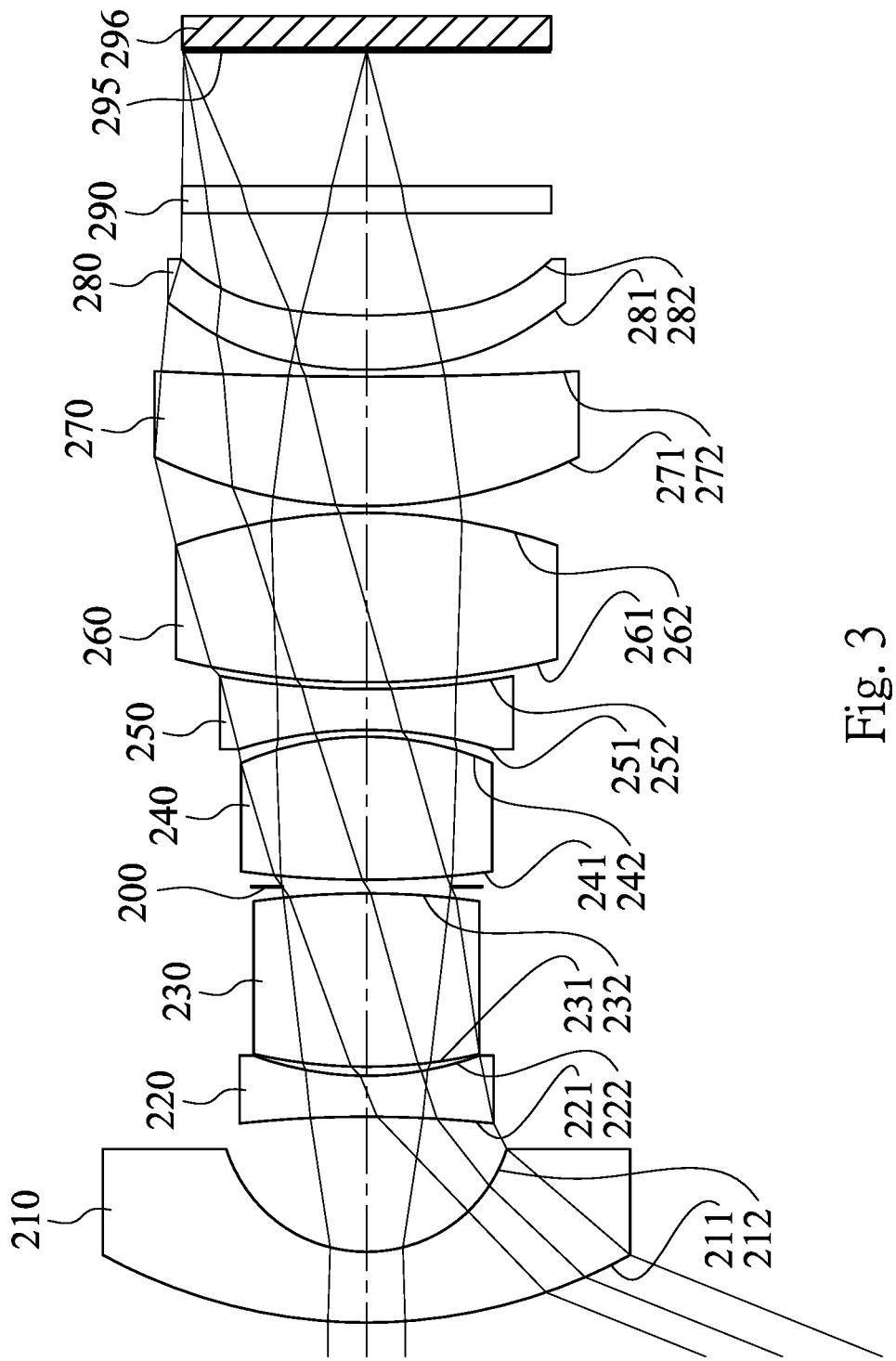
FIG. 3 is a schematic view of an image capturing device according to the 2nd embodiment of the present disclosure.
Figure 4:
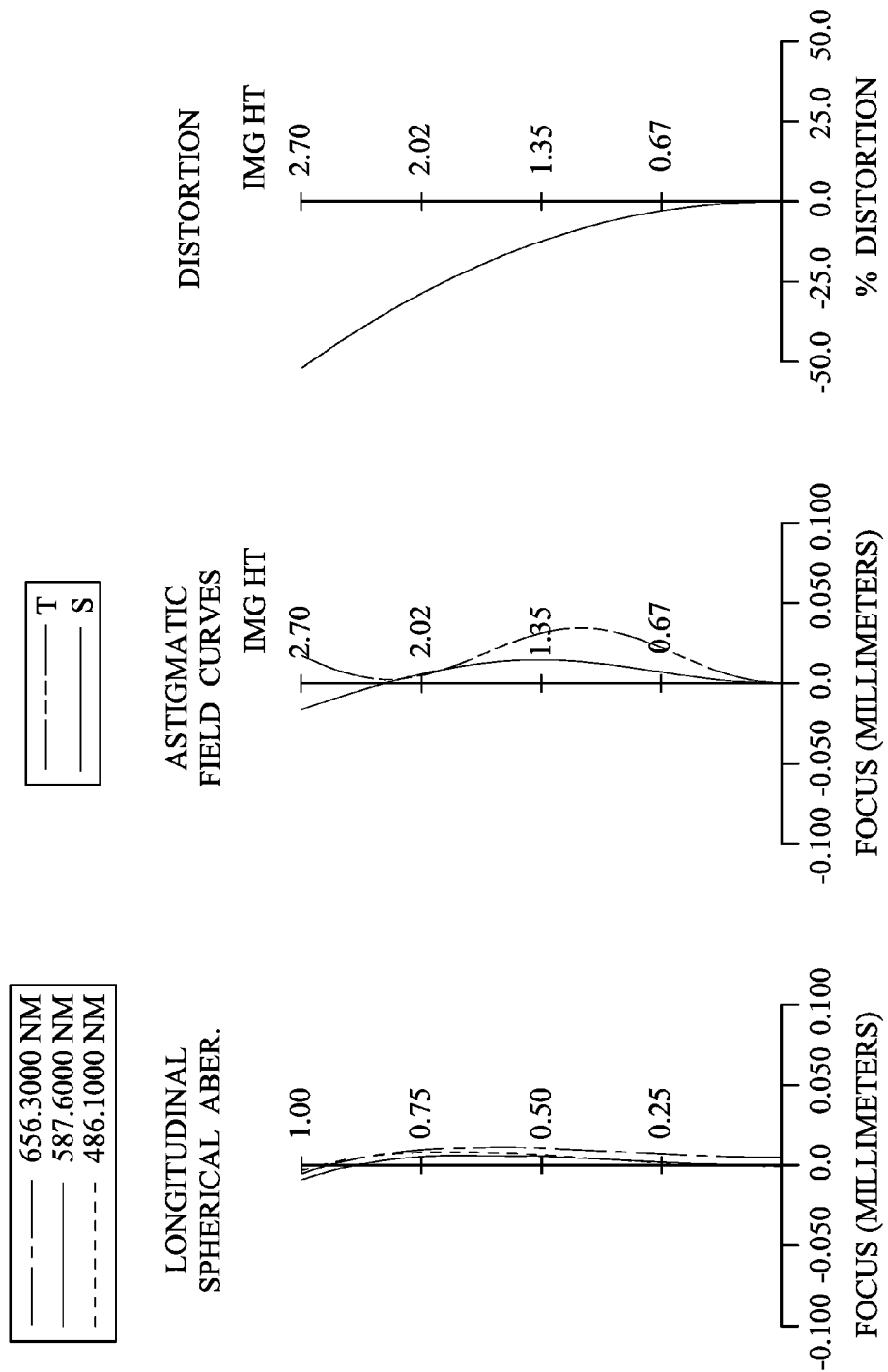
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an image capturing optical lens assembly (its reference numeral is omitted) and an image sensor 296. The image capturing optical lens assembly includes, in order from an object side to an image side, a front lens group (its reference numeral is omitted), an aperture stop 200, a rear lens group (its reference numeral is omitted), a filter 290 and an image surface 295, wherein the image sensor 296 is disposed on the image surface 295 of the image capturing optical lens assembly, and the image capturing optical lens assembly has a total of eight lens elements. In detail, the front lens group has a total of three lens elements, in order from the object side to the image side, a first lens element 210, a second lens element 220 and a third lens element 230, and the rear lens group has a total of five lens elements, in order from the object side to the image side, a fourth lens element 240, a fifth lens element 250, a sixth lens element 260, a seventh lens element 270 and an eighth lens element 280.

The first lens element 210 with negative refractive power has an object-side surface 211 being convex and an image-side surface 212 being concave. The first lens element 210 is made of a glass material, and has the object-side surface 211 and the image-side surface 212 being both spherical.

The second lens element 220 with negative refractive power has an object-side surface 221 being concave and an image-side surface 222 being concave. The second lens element 220 is made of a glass material, and has the object-side surface 221 and the image-side surface 222 being both spherical.

The third lens element 230 with positive refractive power has an object-side surface 231 being convex and an image-side surface 232 being convex. The third lens element 230 is made of a glass material, and has the object-side surface 231 and the image-side surface 232 being both spherical.

The fourth lens element 240 with positive refractive power has an object-side surface 241 being convex and an image-side surface 242 being convex. The fourth lens element 240 is made of a glass material, and has the object-side surface 241 and the image-side surface 242 being both spherical.

The fifth lens element 250 with negative refractive power has an object-side surface 251 being concave and an image-side surface 252 being concave. The fifth lens element 250 is made of a glass material, and has the object-side surface 251 and the image-side surface 252 being both spherical.

The sixth lens element 260 with positive refractive power has an object-side surface 261 being convex and an image-side surface 262 being convex. The sixth lens element 260 is made of a glass material, and has the object-side surface 261 and the image-side surface 262 being both spherical.

The seventh lens element 270 with positive refractive power has an object-side surface 271 being convex and an image-side surface 272 being concave. The seventh lens element 270 is made of a glass material, and has the object-side surface 271 and the image-side surface 272 being both spherical.

The eighth lens element 280 with positive refractive power has an object-side surface 281 being convex and an image-side surface 282 being concave. The eighth lens element 280 is made of a plastic material, and has the object-side surface 281 and the image-side surface 282 being both aspheric.

The filter 290 is made of a glass material and located between the eighth lens element 280 and the image surface 295, and will not affect the focal length of the image capturing optical lens assembly.

The detailed optical data of the 2nd embodiment are shown in Table 3 and the aspheric surface data are shown in Table 4 below.

TABLE 3

2nd Embodiment
f = 2.27 mm, Fno = 2.00, HFOV = 68.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.040 | 1.037 | Glass | 1.804 | 46.6 | −3.98 |
| 2 | | 2.158 | 1.989 | | | | |
| 3 | Lens 2 | −17.784 | 0.600 | Glass | 1.804 | 46.6 | −4.61 |
| 4 | | 4.748 | 0.134 | | | | |
| 5 | Lens 3 | 7.469 | 2.548 | Glass | 1.959 | 17.5 | 5.11 |
| 6 | | −11.851 | 0.100 | | | | |
| 7 | Ape. Stop | Plano | 0.100 | | | | |
| 8 | Lens 4 | 14.046 | 2.102 | Glass | 1.729 | 54.7 | 4.97 |
| 9 | | −4.571 | 0.100 | | | | |
| 10 | Lens 5 | −6.343 | 0.600 | Glass | 1.959 | 17.5 | −4.28 |
| 11 | | 12.201 | 0.100 | | | | |
| 12 | Lens 6 | 11.628 | 2.490 | Glass | 1.772 | 49.6 | 6.69 |
| 13 | | −8.425 | 0.100 | | | | |
| 14 | Lens 7 | 7.078 | 1.901 | Glass | 1.729 | 54.7 | 10.85 |
| 15 | | 59.625 | 0.100 | | | | |
| 16 | Lens 8 | 5.528 ASP | 0.800 | Plastic | 1.544 | 55.9 | 24.41 |
| 17 | | 8.984 ASP | 1.500 | | | | |
| 18 | Filter | Plano | 0.400 | Glass | 1.517 | 64.2 | — |
| 19 | | Plano | 2.001 | | | | |
| 20 | Image | Plano | — | | | | |

Reference wavelength is 587.6 nm (d-line).

TABLE 4

Aspheric Coefficients

| Surface # | 16 | 17 |
|---|---|---|
| k = | 1.2214E+00 | 7.2932E+00 |
| A4 = | −6.1060E−04 | 3.2375E−03 |

TABLE 4-continued

Aspheric Coefficients

| Surface # | 16 | 17 |
|---|---|---|
| A6 = | 4.4153E−04 | 1.9146E−04 |
| A8 = | −6.2052E−06 | 9.6665E−05 |
| A10 = | −3.7246E−06 | −1.2434E−05 |
| A12 = | 2.9846E−08 | 4.6206E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.27 | Td/ΣAT | 5.44 |
| Fno | 2.00 | Td/BL | 3.79 |
| HFOV [deg.] | 68.0 | |R1|/R2 | 3.73 |
| FOV [deg.] | 136.0 | Ri/f | 3.96 |
| ImgH/EPD | 2.38 | (f/fs1) + (f/fs2) | 0.90 |
| |Yi/ImgH| | 1.01 | |f/fi| | 0.09 |
| T12/ΣAT | 0.73 | | |

Moreover, according to the 2nd embodiment, at least one lens element of the front lens group has an Abbe number smaller than 25, that is, the third lens element 230; at least one lens element of the rear lens group has an Abbe number smaller than 25, that is, the fifth lens element 250. At least one lens element of the front lens group has a refractive index greater than 1.90, that is, the third lens element 230; at least one lens element of the rear lens group has a refractive index greater than 1.90, that is, the fifth lens element 250.

3rd Embodiment

Figure 5:
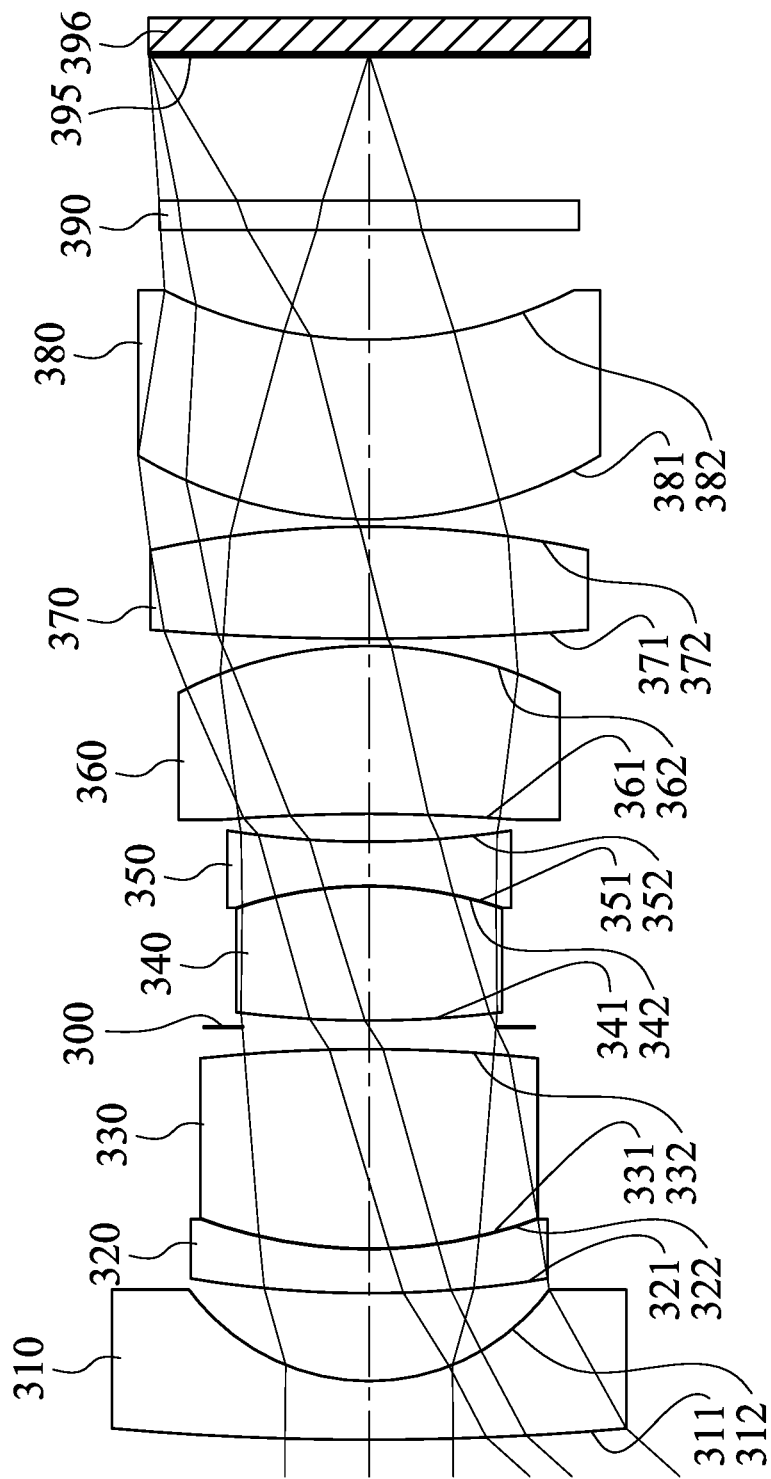
FIG. 5 is a schematic view of an image capturing device according to the 3rd embodiment of the present disclosure.
Figure 6:
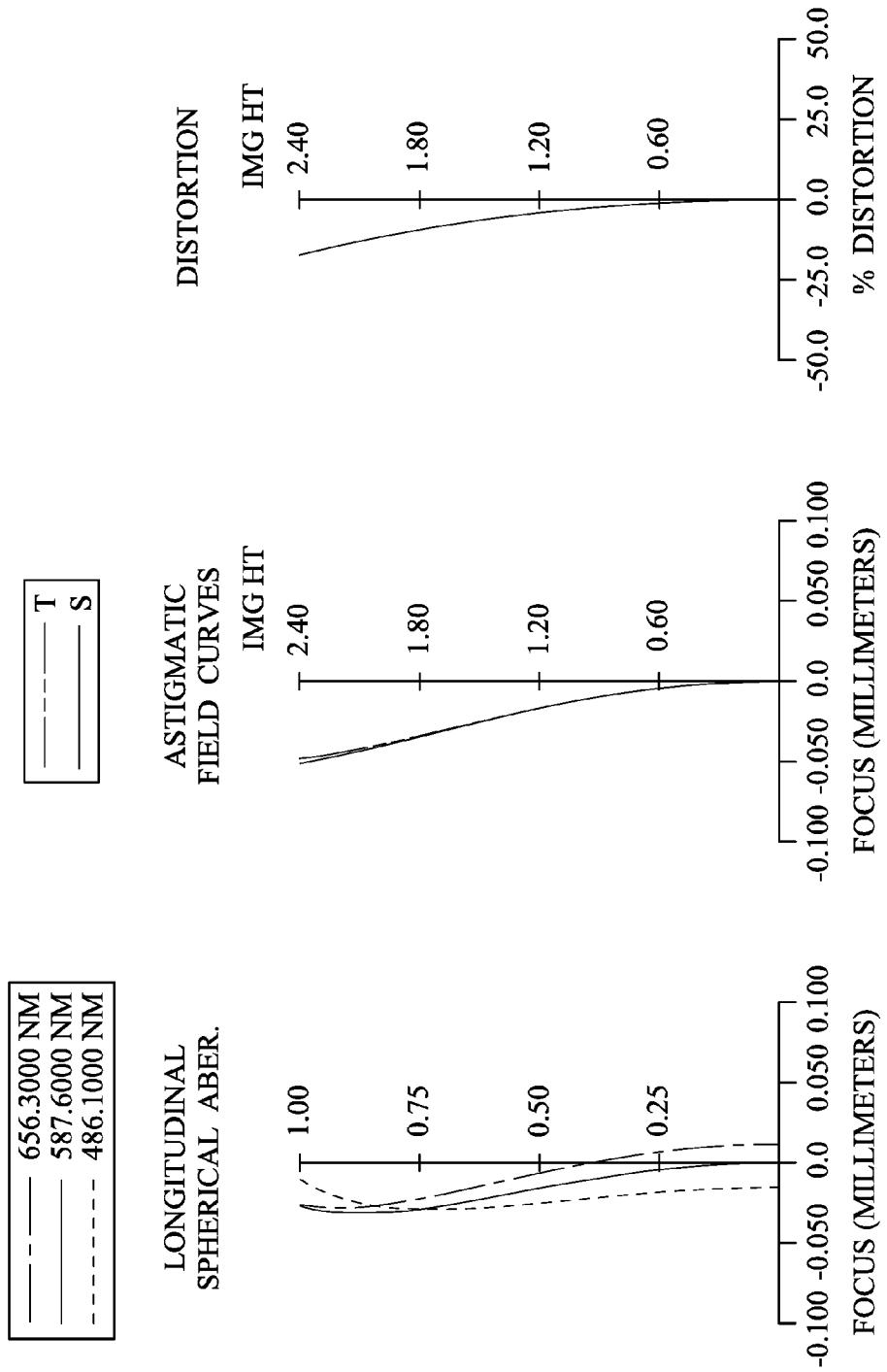
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an image capturing optical lens assembly (its reference numeral is omitted) and an image sensor 396. The image capturing optical lens assembly includes, in order from an object side to an image side, a front lens group (its reference numeral is omitted), an aperture stop 300, a rear lens group (its reference numeral is omitted), a filter 390 and an image surface 395, wherein the image sensor 396 is disposed on the image surface 395 of the image capturing optical lens assembly, and the image capturing optical lens assembly has a total of eight lens elements. In detail, the front lens group has a total of three lens elements, in order from the object side to the image side, a first lens element 310, a second lens element 320 and a third lens element 330, and the rear lens group has a total of five lens elements, in order from the object side to the image side, a fourth lens element 340, a fifth lens element 350, a sixth lens element 360, a seventh lens element 370 and an eighth lens element 380.

The first lens element 310 with negative refractive power has an object-side surface 311 being convex and an image-side surface 312 being concave. The first lens element 310 is made of a glass material, and has the object-side surface 311 and the image-side surface 312 being both spherical.

The second lens element 320 with negative refractive power has an object-side surface 321 being convex and an image-side surface 322 being concave. The second lens element 320 is made of a glass material, and has the object-side surface 321 and the image-side surface 322 being both spherical.

The third lens element 330 with positive refractive power has an object-side surface 331 being convex and an image-side surface 332 being convex. The third lens element 330 is made of a glass material, and has the object-side surface 331 and the image-side surface 332 being both spherical, wherein the object-side surface 331 of the third lens element 330 is cemented to the image-side surface 322 of the second lens element 320.

The fourth lens element 340 with positive refractive power has an object-side surface 341 being convex and an image-side surface 342 being convex. The fourth lens element 340 is made of a glass material, and has the object-side surface 341 and the image-side surface 342 being both spherical.

The fifth lens element 350 with negative refractive power has an object-side surface 351 being concave and an image-side surface 352 being concave. The fifth lens element 350 is made of a glass material, and has the object-side surface 351 and the image-side surface 352 being both spherical, wherein the object-side surface 351 of the fifth lens element 350 is cemented to the image-side surface 342 of the fourth lens element 340.

The sixth lens element 360 with positive refractive power has an object-side surface 361 being concave and an image-side surface 362 being convex. The sixth lens element 360 is made of a glass material, and has the object-side surface 361 and the image-side surface 362 being both spherical.

The seventh lens element 370 with positive refractive power has an object-side surface 371 being convex and an image-side surface 372 being convex. The seventh lens element 370 is made of a glass material, and has the object-side surface 371 and the image-side surface 372 being both spherical.

The eighth lens element 380 with positive refractive power has an object-side surface 381 being convex and an image-side surface 382 being concave. The eighth lens element 380 is made of a glass material, and has the object-side surface 381 and the image-side surface 382 being both spherical.

The filter 390 is made of a glass material and located between the eighth lens element 380 and the image surface 395, and will not affect the focal length of the image capturing optical lens assembly.

The detailed optical data of the 3rd embodiment are shown in Table 5 below.

TABLE 5

3rd Embodiment
f = 3.79 mm, Fno = 1.65, HFOV = 48.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 39.268 | 0.800 | Glass | 1.678 | 55.3 | −4.90 |

TABLE 5-continued

3rd Embodiment
f = 3.79 mm, Fno = 1.65, HFOV = 48.0 deg.

| Surface # | | Curvature Radius | Thickness | Material | Index | Abbe # | Focal Length |
|---|---|---|---|---|---|---|---|
| 2 | | 3.037 | 1.200 | | | | |
| 3 | Lens 2 | 14.827 | 0.600 | Glass | 1.847 | 23.8 | −14.59 |
| 4 | | 6.614 | 0.010 | Cement | 1.514 | 38.8 | |
| 5 | Lens 3 | 6.621 | 2.720 | Glass | 1.959 | 17.5 | 5.52 |
| 6 | | −21.182 | 0.300 | | | | |
| 7 | Ape. Stop | Plano | 0.090 | | | | |
| 8 | Lens 4 | 14.461 | 1.830 | Glass | 1.804 | 46.6 | 5.24 |
| 9 | | −5.607 | 0.010 | Cement | 1.514 | 38.8 | |
| 10 | Lens 5 | −5.599 | 0.600 | Glass | 1.959 | 17.5 | −3.95 |
| 11 | | 12.369 | 0.380 | | | | |
| 12 | Lens 6 | −25.462 | 2.290 | Glass | 1.804 | 46.6 | 8.50 |
| 13 | | −5.604 | 0.100 | | | | |
| 14 | Lens 7 | 36.801 | 1.530 | Glass | 1.804 | 46.6 | 12.80 |
| 15 | | −14.015 | 0.100 | | | | |
| 16 | Lens 8 | 6.143 | 2.450 | Glass | 1.678 | 55.3 | 57.47 |
| 17 | | 6.118 | 1.500 | | | | |
| 18 | Filter | Plano | 0.400 | Glass | 1.517 | 64.2 | — |
| 19 | | Plano | 1.991 | | | | |
| 20 | Image | Plano | — | | | | |

Reference wavelength is 587.6 nm (d-line).
Effective radius of surface 16 is 3.150 mm.

The definitions of these parameters shown in the following table are the same as those stated in the 1st embodiment with corresponding values for the 3rd embodiment, so an explanation in this regard will not be provided again. Moreover, these parameters can be calculated from Table 5 as the following values and satisfy the following conditions:

| 3rd Embodiment | | | |
|---|---|---|---|
| f [mm] | 3.79 | Td/ΣAT | 6.85 |
| Fno | 1.65 | Td/BL | 3.86 |
| HFOV [deg.] | 48.0 | |R1|/R2 | 12.93 |
| FOV [deg.] | 96.0 | Ri/f | 1.61 |
| ImgH/EPD | 1.31 | (f/fs1) + (f/fs2) | 1.41 |
| |Yi/ImgH| | 0.93 | |f/fi| | 0.07 |
| T12/ΣAT | 0.55 | | |

Moreover, according to the 3rd embodiment, at least one lens element of the front lens group has an Abbe number smaller than 25, that is, the second lens element 320 and the third lens element 330; at least one lens element of the rear lens group has an Abbe number smaller than 25, that is, the fifth lens element 350. At least one lens element of the front lens group has a refractive index which is greater than 1.90, that is, the third lens element 330; at least one lens element of the rear lens group has a refractive index greater than 1.90, that is, the fifth lens element 350.

4th Embodiment

Figure 7:
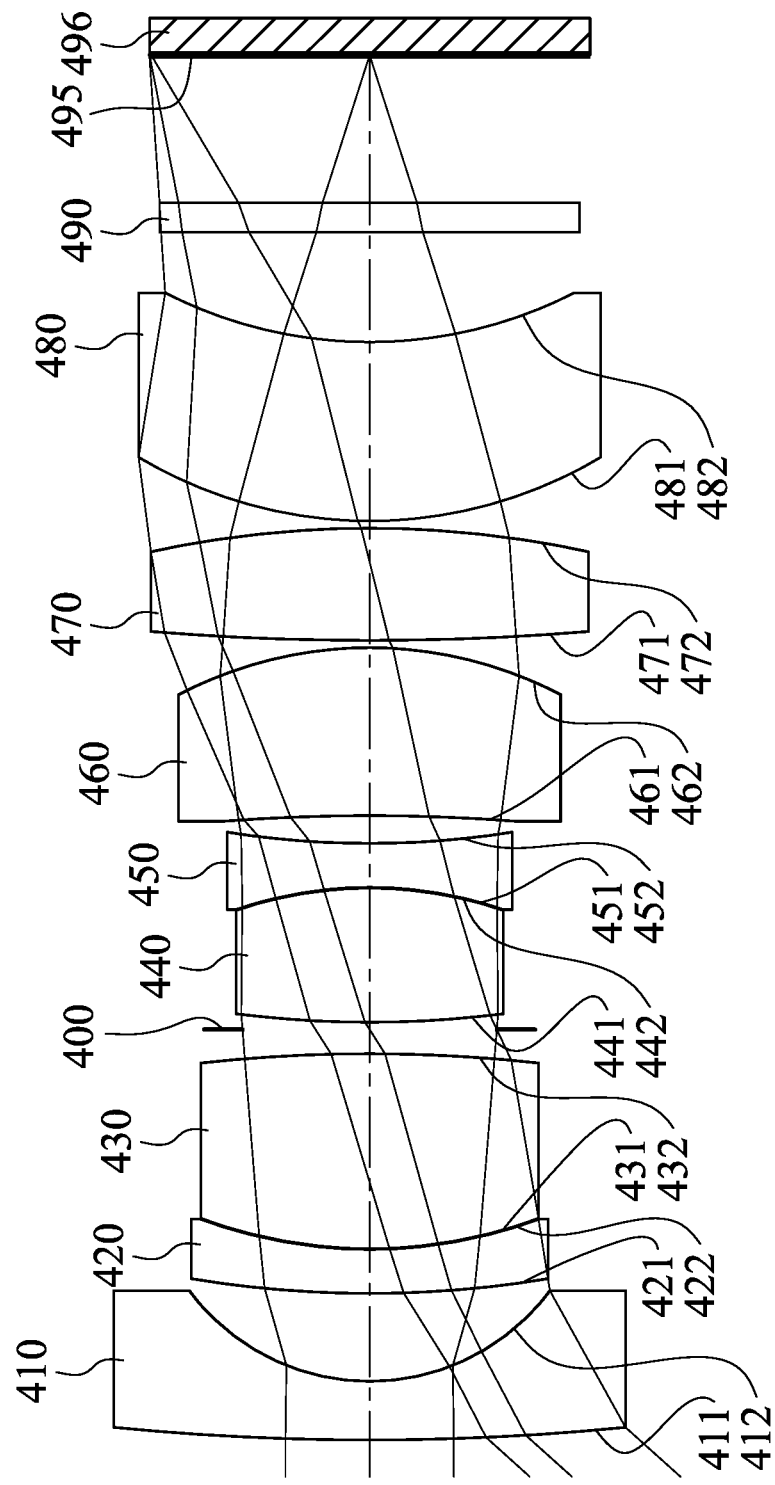
FIG. 7 is a schematic view of an image capturing device according to the 4th embodiment of the present disclosure.
Figure 8:
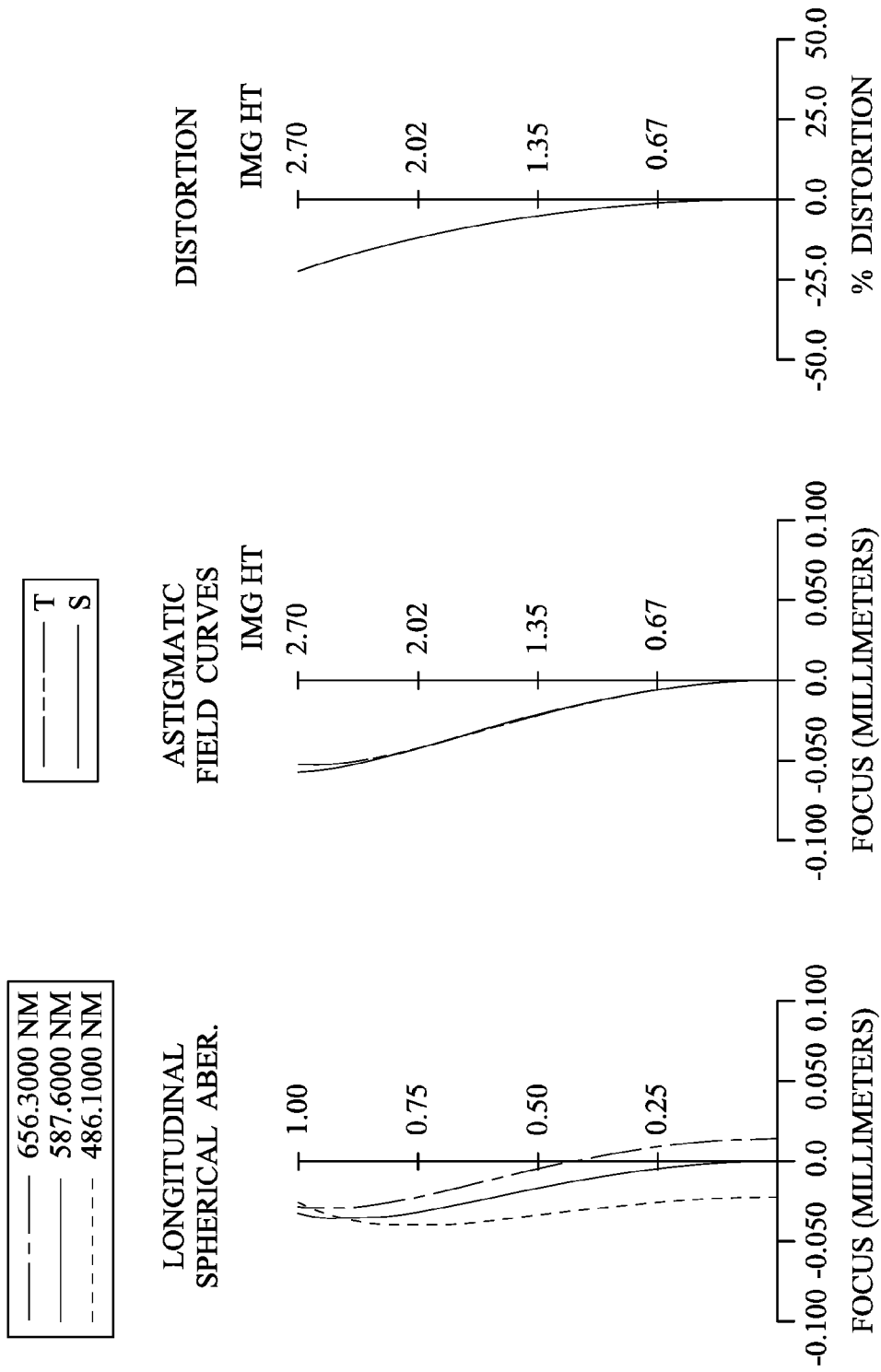
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an image capturing optical lens assembly (its reference numeral is omitted) and an image sensor 496. The image capturing optical lens assembly includes, in order from an object side to an image side, a front lens group (its reference numeral is omitted), an aperture stop 400, a rear lens group (its reference numeral is omitted), a filter 490 and an image surface 495, wherein the image sensor 496 is disposed on the image surface 495 of the image capturing optical lens assembly, and the image capturing optical lens assembly has a total of eight lens elements. In detail, the front lens group has a total of three lens elements, in order from the object side to the image side, a first lens element 410, a second lens element 420 and a third lens element 430, and the rear lens group has a total of five lens elements, in order from the object side to the image side, a fourth lens element 440, a fifth lens element 450, a sixth lens element 460, a seventh lens element 470 and an eighth lens element 480.

The first lens element 410 with negative refractive power has an object-side surface 411 being convex and an image-side surface 412 being concave. The first lens element 410 is made of a glass material, and has the object-side surface 411 and the image-side surface 412 being both spherical.

The second lens element 420 with negative refractive power has an object-side surface 421 being convex and an image-side surface 422 being concave. The second lens element 420 is made of a glass material, and has the object-side surface 421 and the image-side surface 422 being both spherical.

The third lens element 430 with positive refractive power has an object-side surface 431 being convex and an image-side surface 432 being convex. The third lens element 430 is made of a glass material, and has the object-side surface 431 and the image-side surface 432 being both spherical, wherein the object-side surface 431 of the third lens element 430 is cemented to the image-side surface 422 of the second lens element 420.

The fourth lens element 440 with positive refractive power has an object-side surface 441 being convex and an image-side surface 442 being convex. The fourth lens element 440 is made of a glass material, and has the object-side surface 441 and the image-side surface 442 being both spherical.

The fifth lens element 450 with negative refractive power has an object-side surface 451 being concave and an image-side surface 452 being concave. The fifth lens element 450 is made of a glass material, and has the object-side surface 451 and the image-side surface 452 being both spherical, wherein the object-side surface 451 of the fifth lens element 450 is cemented to the image-side surface 442 of the fourth lens element 440.

The sixth lens element 460 with positive refractive power has an object-side surface 461 being concave and an image-side surface 462 being convex. The sixth lens element 460 is made of a glass material, and has the object-side surface 461 and the image-side surface 462 being both spherical.

The seventh lens element 470 with positive refractive power has an object-side surface 471 being convex and an image-side surface 472 being convex. The seventh lens element 470 is made of a glass material, and has the object-side surface 471 and the image-side surface 472 being both spherical.

The eighth lens element 480 with positive refractive power has an object-side surface 481 being convex and an image-side surface 482 being concave. The eighth lens element 480 is made of a glass material, and has the object-side surface 481 and the image-side surface 482 being both spherical.

The filter 490 is made of a glass material and located between the eighth lens element 480 and the image surface 495, and will not affect the focal length of the image capturing optical lens assembly.

The detailed optical data of the 4th embodiment are shown in Table 6 below.

TABLE 6

4th Embodiment
f = 3.79 mm, Fno = 1.65, HFOV = 48.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 35.137 | 0.800 | Glass | 1.702 | 41.1 | −4.83 |
| 2 | | 3.059 | 1.200 | | | | |
| 3 | Lens 2 | 14.776 | 0.600 | Glass | 1.834 | 37.2 | −14.85 |
| 4 | | 6.614 | 0.010 | Cement | 1.514 | 38.8 | |
| 5 | Lens 3 | 6.621 | 2.660 | Glass | 1.959 | 17.5 | 5.52 |
| 6 | | −21.182 | 0.330 | | | | |
| 7 | Ape. Stop | Plano | 0.100 | | | | |
| 8 | Lens 4 | 14.461 | 1.830 | Glass | 1.804 | 46.6 | 5.24 |
| 9 | | −5.607 | 0.010 | Cement | 1.514 | 38.8 | |
| 10 | Lens 5 | −5.599 | 0.600 | Glass | 1.959 | 17.5 | −3.95 |
| 11 | | 12.369 | 0.380 | | | | |
| 12 | Lens 6 | −25.462 | 2.290 | Glass | 1.804 | 46.6 | 8.50 |
| 13 | | −5.604 | 0.100 | | | | |
| 14 | Lens 7 | 36.801 | 1.530 | Glass | 1.804 | 46.6 | 12.80 |
| 15 | | −14.015 | 0.100 | | | | |
| 16 | Lens 8 | 6.143 | 2.440 | Glass | 1.678 | 55.3 | 57.71 |
| 17 | | 6.118 | 1.500 | | | | |
| 18 | Filter | Plano | 0.400 | Glass | 1.517 | 64.2 | — |
| 19 | | Plano | 2.019 | | | | |
| 20 | Image | Plano | — | | | | |

Reference wavelength is 587.6 nm (d-line).
Effective radius of surface 16 is 3.150 mm.

The definitions of these parameters shown in the following table are the same as those stated in the 1st embodiment with corresponding values for the 4th embodiment, so an explanation in this regard will not be provided again. Moreover, these parameters can be calculated from Table 6 as the following values and satisfy the following conditions:

| 4th Embodiment | | | |
|---|---|---|---|
| f [mm] | 3.79 | Td/ΣAT | 6.72 |
| Fno | 1.65 | Td/BL | 3.82 |
| HFOV [deg.] | 48.0 | |R1|/R2 | 11.49 |
| FOV [deg.] | 96.0 | Ri/f | 1.61 |
| ImgH/EPD | 1.31 | (f/fs1) + (f/fs2) | 1.41 |
| |Yi/ImgH| | 0.93 | |f/fi| | 0.07 |
| T12/ΣAT | 0.54 | | |

Moreover, according to the 4th embodiment, at least one lens element of the front lens group has an Abbe number smaller than 25, that is, the third lens element 430; at least one lens element of the rear lens group has an Abbe number which is smaller than 25, that is, the fifth lens element 450. At least one lens element of the front lens group has a refractive index greater than 1.90, that is, the third lens element 430; at least one lens element of the rear lens group has a refractive index greater than 1.90, that is, the fifth lens element 450.

5th Embodiment

Figure 9:
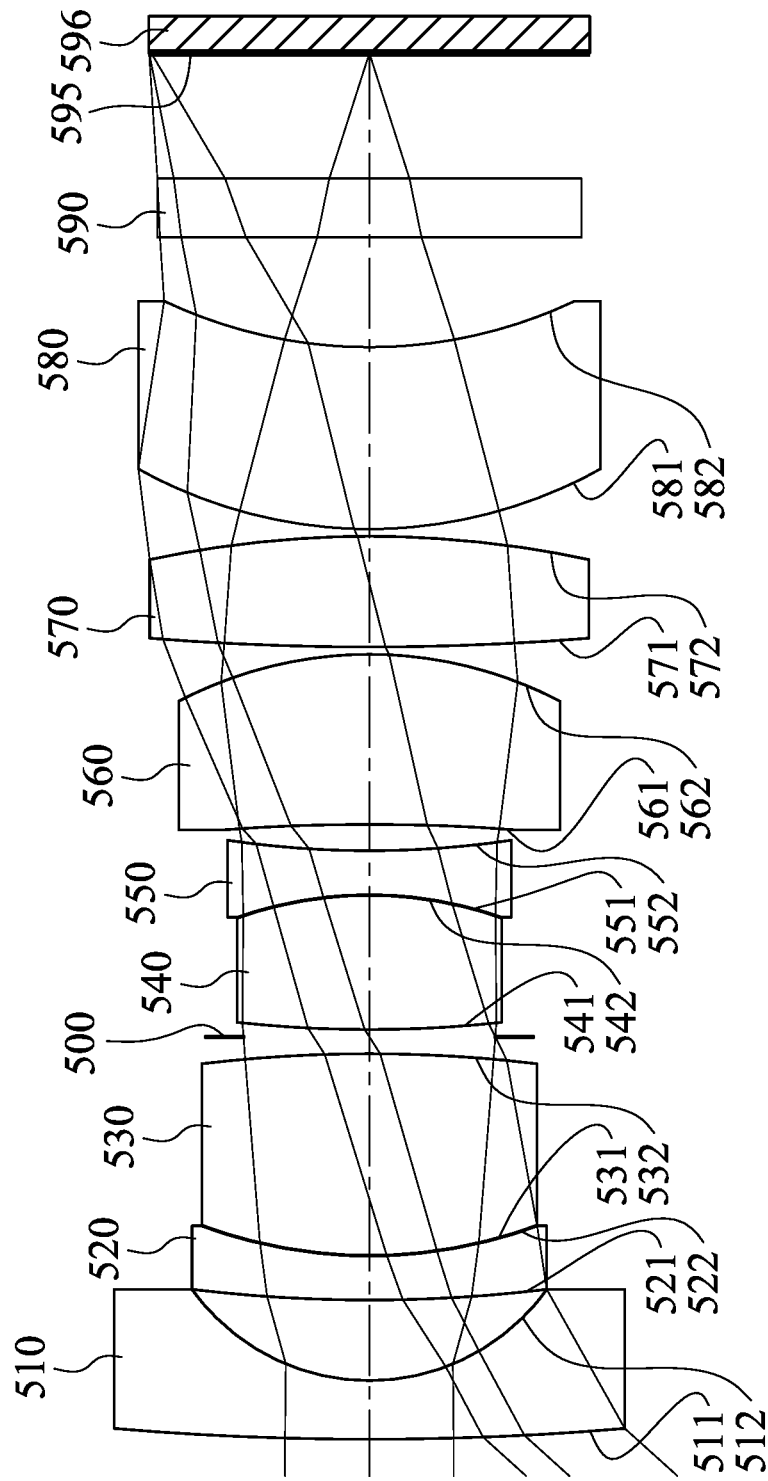
FIG. 9 is a schematic view of an image capturing device according to the 5th embodiment of the present disclosure.
Figure 10:
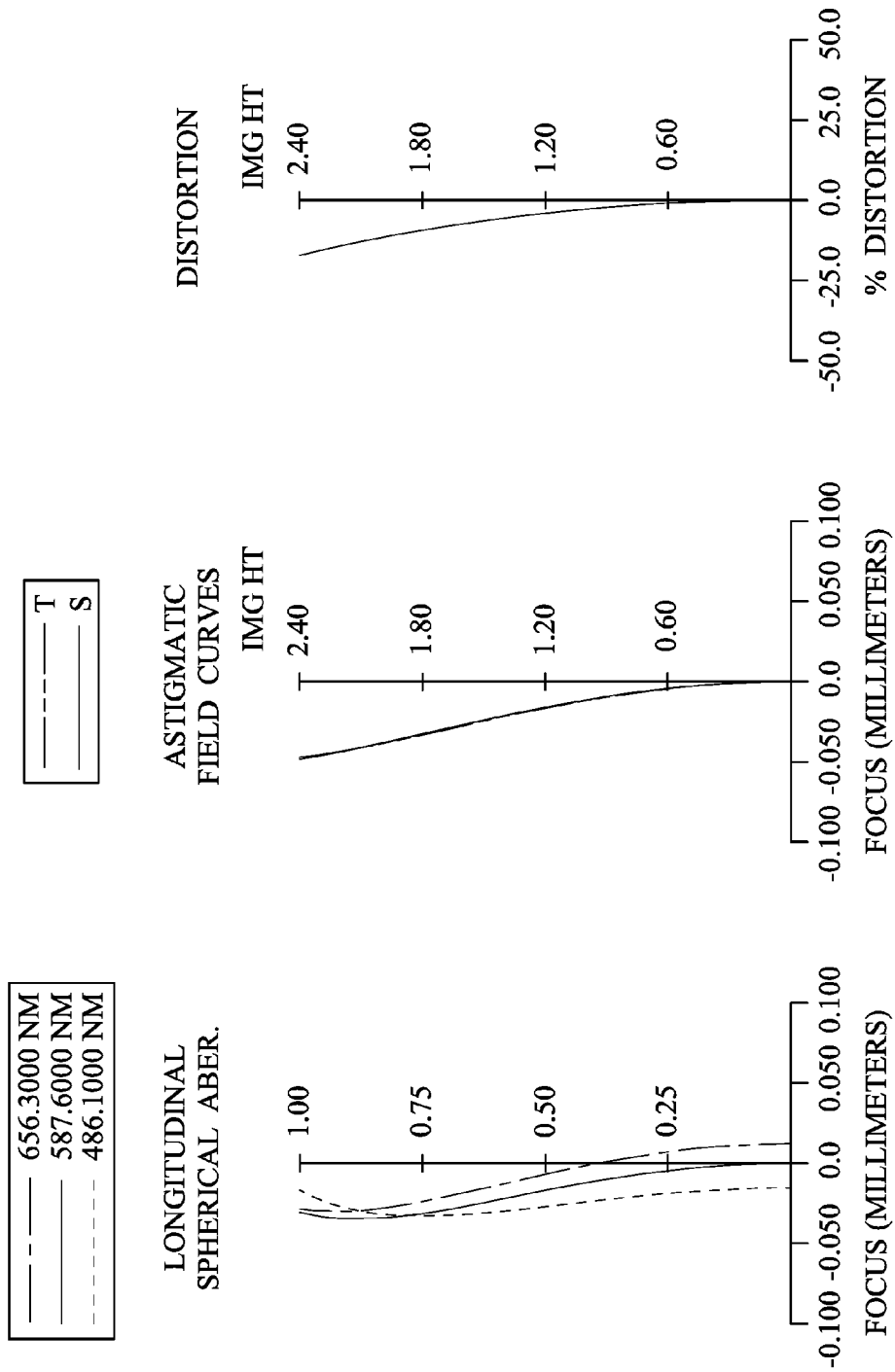
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an image capturing optical lens assembly (its reference numeral is omitted) and an image sensor 596. The image capturing optical lens assembly includes, in order from an object side to an image side, a front lens group (its reference numeral is omitted), an aperture stop 500, a rear lens group (its reference numeral is omitted), a filter 590 and an image surface 595, wherein the image sensor 596 is disposed on the image surface 595 of the image capturing optical lens assembly, and the image capturing optical lens assembly has a total of eight lens elements. In detail, the front lens group has a total of three lens elements, in order from the object side to the image side, a first lens element 510, a second lens element 520 and a third lens element 530, and the rear lens group has a total of five lens elements, in order from the object side to the image side, a fourth lens element 540, a fifth lens element 550, a sixth lens element 560, a seventh lens element 570 and an eighth lens element 580.

The first lens element 510 with negative refractive power has an object-side surface 511 being convex and an image-side surface 512 being concave. The first lens element 510 is made of a glass material, and has the object-side surface 511 and the image-side surface 512 being both spherical.

The second lens element 520 with negative refractive power has an object-side surface 521 being convex and an image-side surface 522 being concave. The second lens element 520 is made of a glass material, and has the object-side surface 521 and the image-side surface 522 being both spherical.

The third lens element 530 with positive refractive power has an object-side surface 531 being convex and an image-side surface 532 being convex. The third lens element 530 is made of a glass material, and has the object-side surface 531 and the image-side surface 532 being both spherical, wherein the object-side surface 531 of the third lens element 530 is cemented to the image-side surface 522 of the second lens element 520.

The fourth lens element 540 with positive refractive power has an object-side surface 541 being convex and an image-side surface 542 being convex. The fourth lens element 540 is made of a glass material, and has the object-side surface 541 and the image-side surface 542 being both spherical.

The fifth lens element 550 with negative refractive power has an object-side surface 551 being concave and an image-side surface 552 being concave. The fifth lens element 550 is made of a glass material, and has the object-side surface 551 and the image-side surface 552 being both spherical, wherein the object-side surface 551 of the fifth lens element 550 is cemented to the image-side surface 542 of the fourth lens element 540.

The sixth lens element 560 with positive refractive power has an object-side surface 561 being concave and an image-side surface 562 being convex. The sixth lens element 560 is made of a glass material, and has the object-side surface 561 and the image-side surface 562 being both spherical.

The seventh lens element 570 with positive refractive power has an object-side surface 571 being convex and an image-side surface 572 being convex. The seventh lens element 570 is made of a glass material, and has the object-side surface 571 and the image-side surface 572 being both spherical.

The eighth lens element 580 with positive refractive power has an object-side surface 581 being convex and an image-side surface 582 being concave. The eighth lens element 580 is made of a glass material, and has the object-side surface 581 and the image-side surface 582 being both spherical.

The filter 590 is made of a glass material and located between the eighth lens element 580 and the image surface 595, and will not affect the focal length of the image capturing optical lens assembly.

The detailed optical data of the 5th embodiment are shown in Table 7 below.

TABLE 7

5th Embodiment
f = 3.79 mm, Fno = 1.65, HFOV = 47.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 40.995 | 0.800 | Glass | 1.652 | 58.5 | −4.96 |
| 2 | | 2.970 | 1.100 | | | | |
| 3 | Lens 2 | 20.068 | 0.600 | Glass | 1.648 | 33.8 | −15.30 |
| 4 | | 6.556 | 0.010 | Cement | 1.514 | 38.8 | |
| 5 | Lens 3 | 6.564 | 2.750 | Glass | 1.923 | 18.9 | 5.59 |
| 6 | | −19.242 | 0.230 | | | | |
| 7 | Ape. Stop | Plano | 0.100 | | | | |
| 8 | Lens 4 | 16.577 | 1.830 | Glass | 1.804 | 46.6 | 5.26 |
| 9 | | −5.398 | 0.010 | Cement | 1.514 | 38.8 | |
| 10 | Lens 5 | −5.402 | 0.600 | Glass | 1.959 | 17.5 | −3.94 |
| 11 | | 13.216 | 0.360 | | | | |
| 12 | Lens 6 | −26.451 | 2.320 | Glass | 1.804 | 46.6 | 8.39 |
| 13 | | −5.584 | 0.100 | | | | |
| 14 | Lens 7 | 37.512 | 1.510 | Glass | 1.804 | 46.6 | 13.00 |
| 15 | | −14.223 | 0.100 | | | | |
| 16 | Lens 8 | 6.463 | 2.480 | Glass | 1.697 | 55.5 | 56.05 |
| 17 | | 6.525 | 1.500 | | | | |
| 18 | Filter | Plano | 0.800 | Glass | 1.517 | 64.2 | — |
| 19 | | Plano | 1.716 | | | | |
| 20 | Image | Plano | — | | | | |

Reference wavelength is 587.6 nm (d-line).
Effective radius of surface 16 is 3.150 mm.

The definitions of these parameters shown in the following table are the same as those stated in the 1st embodiment with corresponding values for the 5th embodiment, so an explanation in this regard will not be provided again. Moreover, these parameters can be calculated from Table 7 as the following values and satisfy the following conditions:

| 5th Embodiment | | | |
|---|---|---|---|
| f [mm] | 3.79 | Td/ΣAT | 7.41 |
| Fno | 1.65 | Td/BL | 3.71 |
| HFOV [deg.] | 47.9 | |R1|/R2 | 13.80 |
| FOV [deg.] | 95.8 | Ri/f | 1.72 |
| ImgH/EPD | 1.31 | (f/fs1) + (f/fs2) | 1.40 |
| |Yi/ImgH| | 0.93 | |f/fi| | 0.07 |
| T12/ΣAT | 0.55 | | |

Moreover, according to the 5th embodiment, at least one lens element of the front lens group has an Abbe number smaller than 25, that is, the third lens element 530; at least one lens element of the rear lens group has an Abbe number smaller than 25, that is, the fifth lens element 550. At least one lens element of the front lens group has a refractive index greater than 1.90, that is, the third lens element 530; at least one lens element of the rear lens group has a refractive index greater than 1.90, that is, the fifth lens element 550.

6th Embodiment

Figure 11:
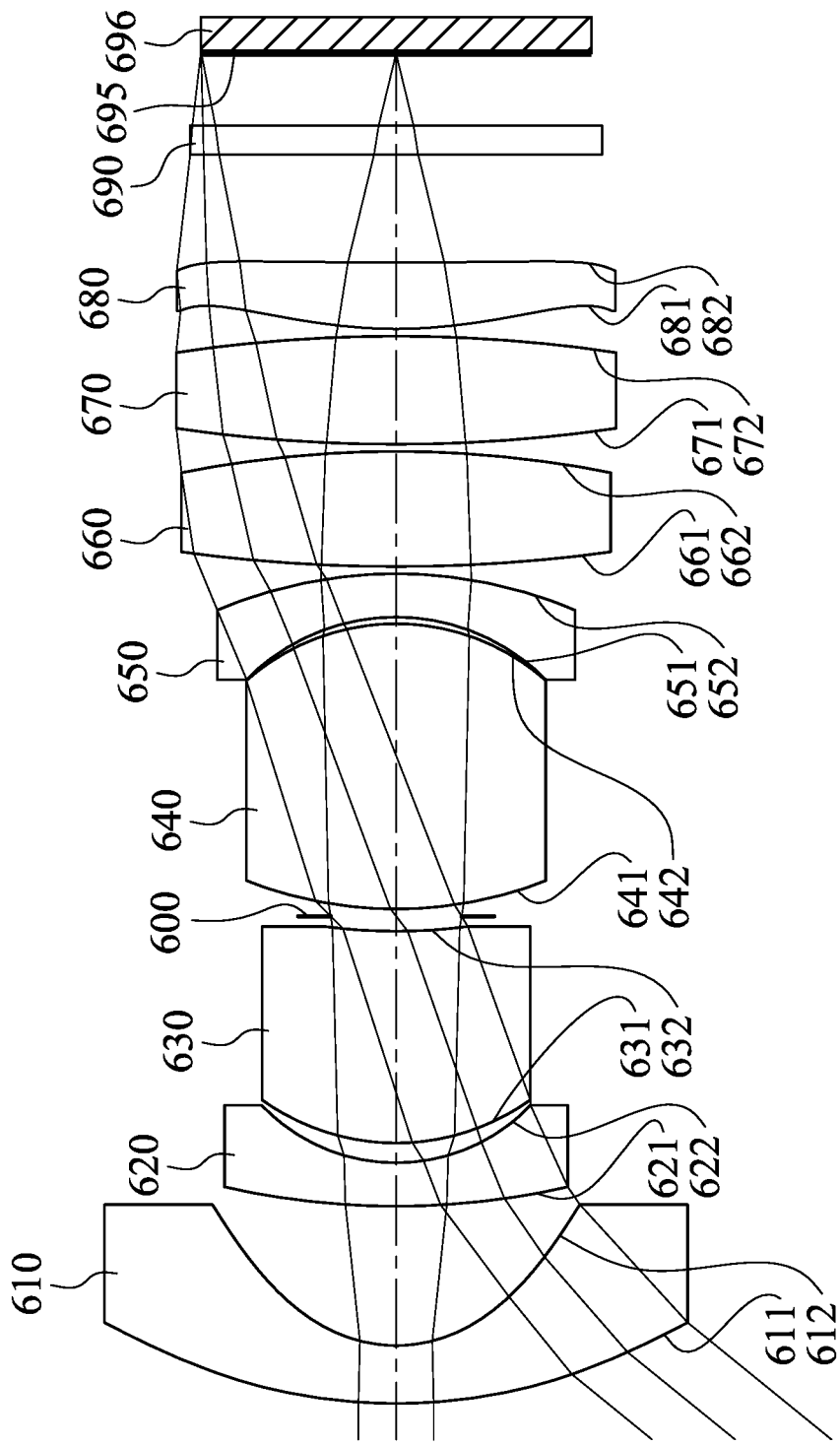
FIG. 11 is a schematic view of an image capturing device according to the 6th embodiment of the present disclosure.
Figure 12:
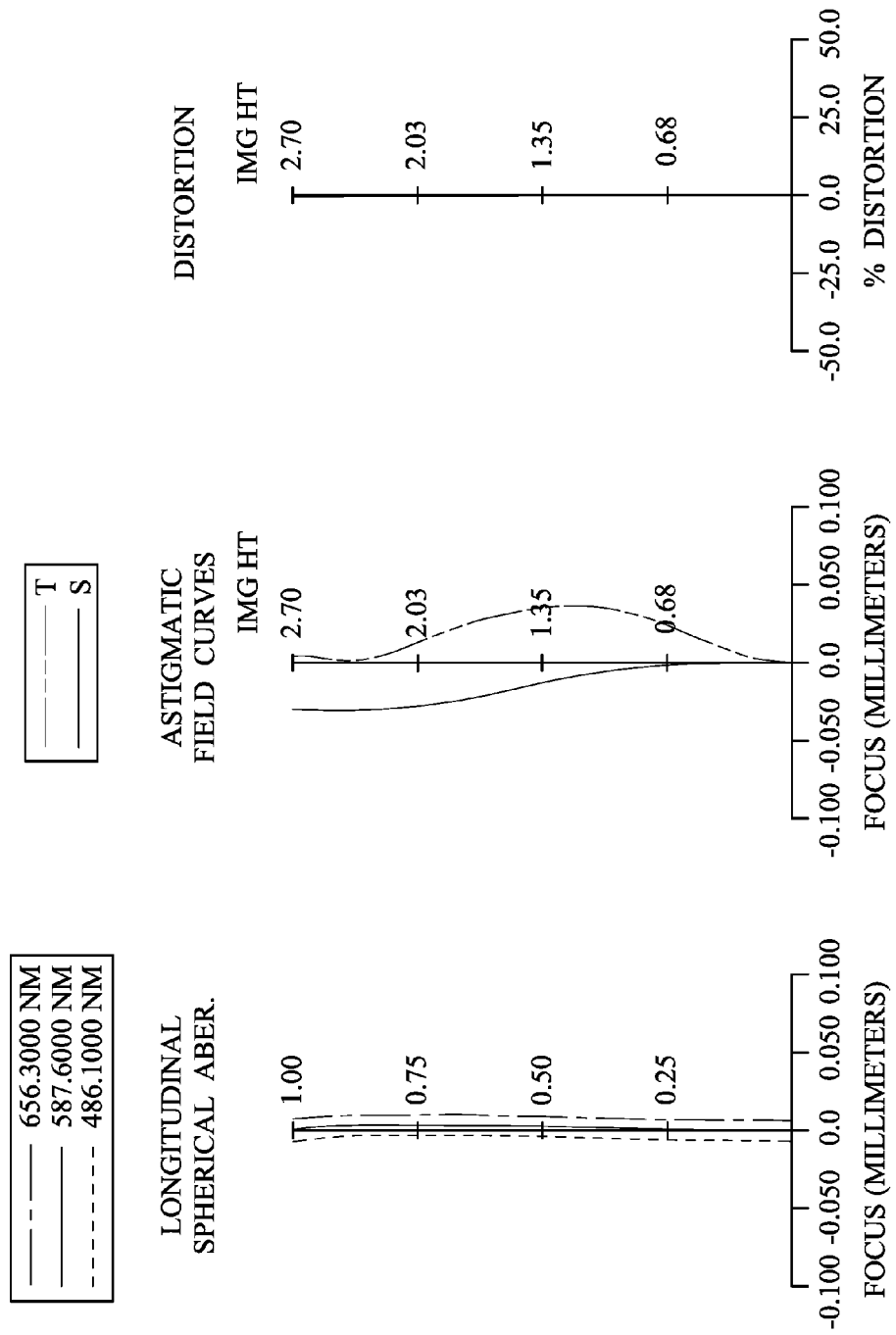
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an image capturing optical lens assembly (its reference numeral is omitted) and an image sensor 696. The image capturing optical lens assembly includes, in order from an object side to an image side, a front lens group (its reference numeral is omitted), an aperture stop 600, a rear lens group (its reference numeral is omitted), a filter 690 and an image surface 695, wherein the image sensor 696 is disposed on the image surface 695 of the image capturing optical lens assembly, and the image capturing optical lens assembly has a total of eight lens elements. In detail, the front lens group has a total of three lens elements, in order from the object side to the image side, a first lens element 610, a second lens element 620 and a third lens element 630, and the rear lens group has a total of five lens elements, in order from the object side to the image side, a fourth lens element 640, a fifth lens element 650, a sixth lens element 660, a seventh lens element 670 and an eighth lens element 680.

The first lens element 610 with negative refractive power has an object-side surface 611 being convex and an image-side surface 612 being concave. The first lens element 610 is made of a plastic material, and has the object-side surface 611 and the image-side surface 612 being both aspheric.

The second lens element 620 with negative refractive power has an object-side surface 621 being convex and an image-side surface 622 being concave. The second lens element 620 is made of a glass material, and has the object-side surface 621 and the image-side surface 622 being both spherical.

The third lens element 630 with positive refractive power has an object-side surface 631 being convex and an image-side surface 632 being concave. The third lens element 630 is made of a glass material, and has the object-side surface 631 and the image-side surface 632 being both spherical.

The fourth lens element 640 with positive refractive power has an object-side surface 641 being convex and an image-side surface 642 being convex. The fourth lens element 640 is made of a glass material, and has the object-side surface 641 and the image-side surface 642 being both spherical.

The fifth lens element 650 with negative refractive power has an object-side surface 651 being concave and an image-side surface 652 being convex. The fifth lens element 650 is made of a glass material, and has the object-side surface 651 and the image-side surface 652 being both spherical.

The sixth lens element 660 with positive refractive power has an object-side surface 661 being convex and an image-side surface 662 being convex. The sixth lens element 660 is made of a glass material, and has the object-side surface 661 and the image-side surface 662 being both spherical.

The seventh lens element 670 with positive refractive power has an object-side surface 671 being convex and an image-side surface 672 being convex. The seventh lens element 670 is made of a glass material, and has the object-side surface 671 and the image-side surface 672 being both spherical.

The eighth lens element 680 with positive refractive power has an object-side surface 681 being convex and an image-side surface 682 being concave. The eighth lens element 680 is made of a plastic material, and has the object-side surface 681 and the image-side surface 682 being both aspheric.

The filter 690 is made of a glass material and located between the eighth lens element 680 and the image surface 695, and will not affect the focal length of the image capturing optical lens assembly.

The detailed optical data of the 6th embodiment are shown in Table 8 and the aspheric surface data are shown in Table 9 below.

TABLE 8

6th Embodiment
f = 2.21 mm, Fno = 2.12, HFOV = 50.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 7.714 ASP | 0.800 | Plastic | 1.544 | 55.9 | −5.05 |
| 2 | | 1.953 ASP | 1.932 | | | | |
| 3 | Lens 2 | 10.671 | 0.600 | Glass | 1.806 | 40.6 | −4.34 |
| 4 | | 2.568 | 0.275 | | | | |
| 5 | Lens 3 | 3.186 | 2.933 | Glass | 1.923 | 20.9 | 4.55 |
| 6 | | 7.374 | 0.208 | | | | |
| 7 | Ape. Stop | Plano | 0.100 | | | | |
| 8 | Lens 4 | 5.655 | 3.952 | Glass | 1.729 | 54.5 | 3.40 |
| 9 | | −3.121 | 0.092 | | | | |
| 10 | Lens 5 | −2.904 | 0.600 | Glass | 1.959 | 17.5 | −6.12 |
| 11 | | −6.327 | 0.100 | | | | |
| 12 | Lens 6 | 21.800 | 1.594 | Glass | 1.806 | 40.6 | 11.30 |
| 13 | | −15.129 | 0.100 | | | | |
| 14 | Lens 7 | 21.192 | 1.497 | Glass | 1.729 | 54.5 | 14.51 |
| 15 | | −20.487 | 0.100 | | | | |
| 16 | Lens 8 | 6.522 ASP | 0.918 | Plastic | 1.544 | 55.9 | 13.82 |
| 17 | | 46.605 ASP | 1.500 | | | | |
| 18 | Filter | Plano | 0.400 | Glass | 1.517 | 64.2 | — |
| 19 | | Plano | 1.002 | | | | |
| 20 | Image | Plano | — | | | | |

Reference wavelength is 587.6 nm (d-line).

TABLE 9

Aspheric Coefficients

| Surface # | 1 | 2 | 16 | 17 |
|---|---|---|---|---|
| k = | 2.3855E−01 | −6.8821E−01 | −1.5379E+00 | −9.8984E+01 |
| A4 = | 4.3117E−04 | 2.2987E−03 | −4.2532E−03 | −2.2967E−03 |
| A6 = | −3.4852E−05 | 2.1671E−04 | 2.0428E−04 | 9.5647E−05 |
| A8 = | −4.7295E−07 | −2.7854E−06 | −8.4670E−06 | 7.3793E−05 |
| A10 = | 3.1645E−08 | −1.4195E−05 | −2.0028E−06 | −1.3764E−05 |
| A12 = | −5.8589E−10 | −1.3224E−16 | −1.0912E−07 | 4.8879E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 8 and Table 9 as the following values and satisfy the following conditions:

6th Embodiment

| f [mm] | 2.21 | Td/ΣAT | 5.44 |
|---|---|---|---|
| Fno | 2.12 | Td/BL | 5.44 |
| HFOV [deg.] | 50.9 | \|R1\|/R2 | 3.95 |
| FOV [deg.] | 101.8 | Ri/f | 21.09 |
| ImgH/EPD | 2.59 | (f/fs1) + (f/fs2) | 1.14 |

| 6th Embodiment | | | |
|---|---|---|---|
| \|Yi/ImgH\| | 1.12 | \|f/fi\| | 0.16 |
| T12/ΣAT | 0.66 | | |

Moreover, according to the 6th embodiment, at least one lens element of the front lens group has an Abbe number smaller than 25, that is, the third lens element 630; at least one lens element of the rear lens group has an Abbe number smaller than 25, that is, the fifth lens element 650. At least one lens element of the front lens group has a refractive index greater than 1.90, that is, the third lens element 630; at least one lens element of the rear lens group has a refractive index greater than 1.90, that is, the fifth lens element 650.

7th Embodiment

Figure 13:
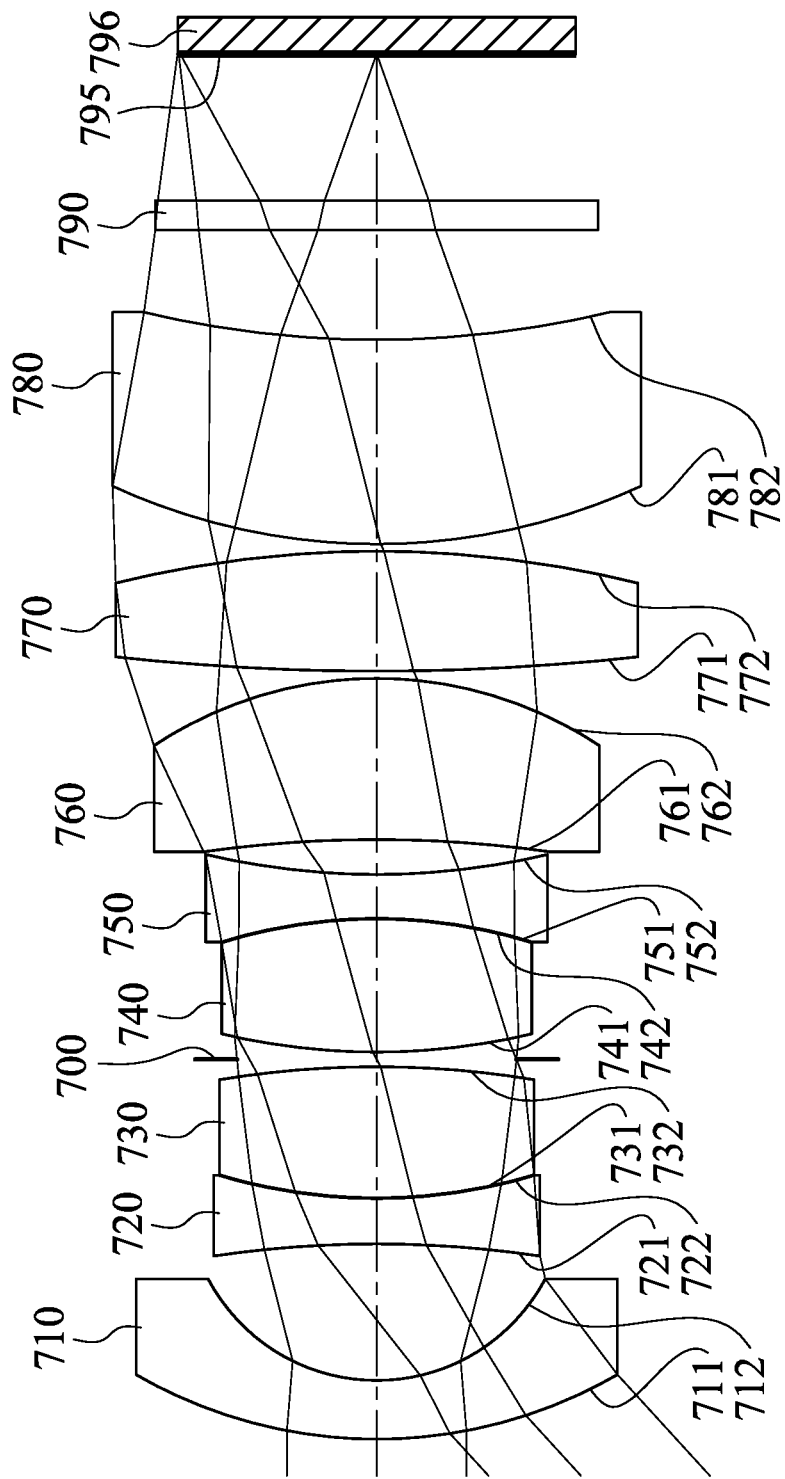
FIG. 13 is a schematic view of an image capturing device according to the 7th embodiment of the present disclosure.
Figure 14:
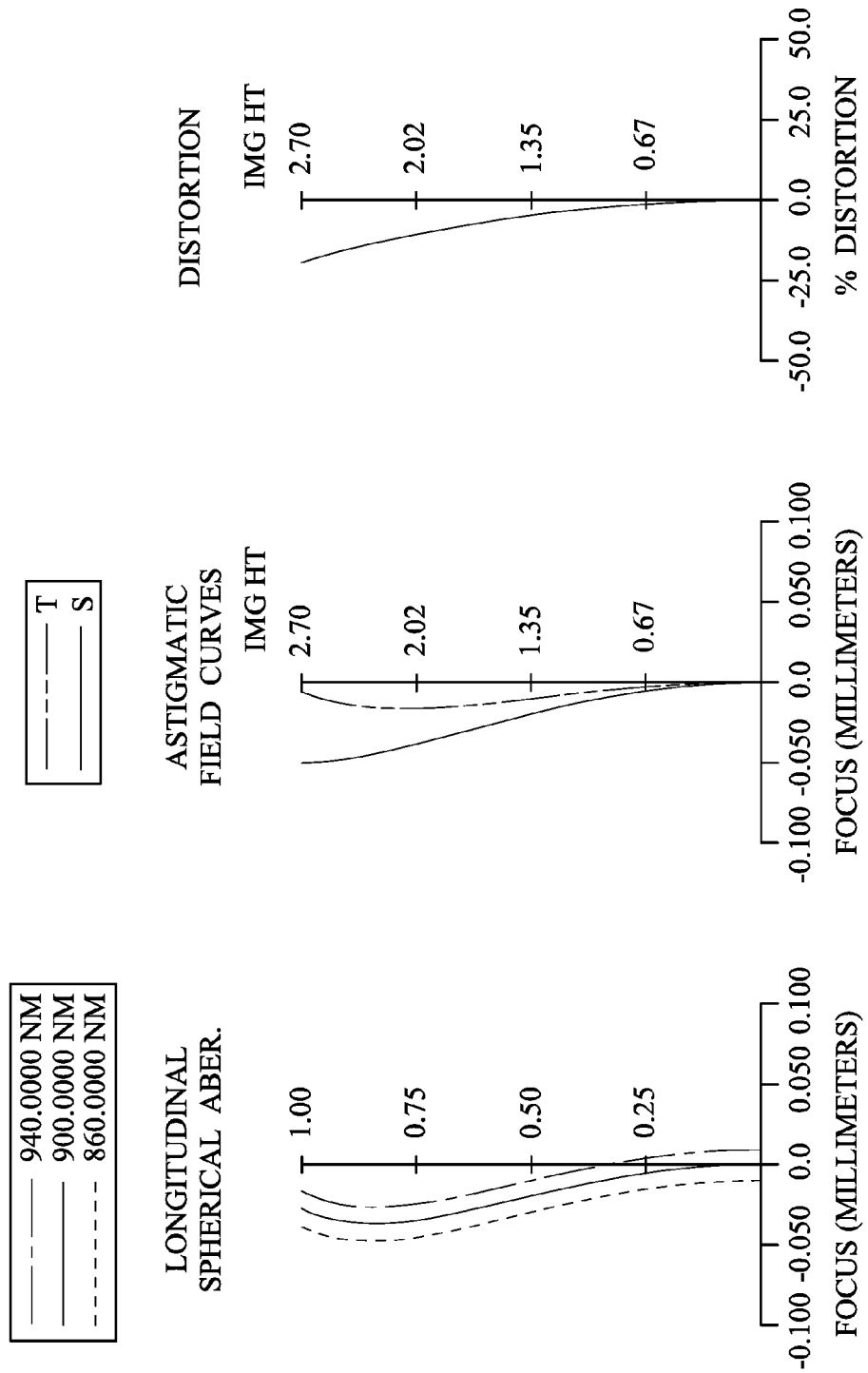
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an image capturing optical lens assembly (its reference numeral is omitted) and an image sensor 796. The image capturing optical lens assembly includes, in order from an object side to an image side, a front lens group (its reference numeral is omitted), an aperture stop 700, a rear lens group (its reference numeral is omitted), a filter 790 and an image surface 795, wherein the image sensor 796 is disposed on the image surface 795 of the image capturing optical lens assembly, and the image capturing optical lens assembly has a total of eight lens elements. In detail, the front lens group has a total of three lens elements, in order from the object side to the image side, a first lens element 710, a second lens element 720 and a third lens element 730, and the rear lens group has a total of five lens elements, in order from the object side to the image side, a fourth lens element 740, a fifth lens element 750, a sixth lens element 760, a seventh lens element 770 and an eighth lens element 780.

The first lens element 710 with negative refractive power has an object-side surface 711 being convex and an image-side surface 712 being concave. The first lens element 710 is made of a glass material, and has the object-side surface 711 and the image-side surface 712 being both spherical.

The second lens element 720 with negative refractive power has an object-side surface 721 being concave and an image-side surface 722 being concave. The second lens element 720 is made of a glass material, and has the object-side surface 721 and the image-side surface 722 being both spherical.

The third lens element 730 with positive refractive power has an object-side surface 731 being convex and an image-side surface 732 being convex. The third lens element 730 is made of a glass material, and has the object-side surface 731 and the image-side surface 732 being both spherical, wherein the object-side surface 731 of the third lens element 730 is cemented to the image-side surface 722 of the second lens element 720.

The fourth lens element 740 with positive refractive power has an object-side surface 741 being convex and an image-side surface 742 being convex. The fourth lens element 740 is made of a glass material, and has the object-side surface 741 and the image-side surface 742 being both spherical.

The fifth lens element 750 with negative refractive power has an object-side surface 751 being concave and an image-side surface 752 being concave. The fifth lens element 750 is made of a glass material, and has the object-side surface 751 and the image-side surface 752 being both spherical, wherein the object-side surface 751 of the fifth lens element 750 is cemented to the image-side surface 742 of the fourth lens element 740.

The sixth lens element 760 with positive refractive power has an object-side surface 761 being concave and an image-side surface 762 being convex. The sixth lens element 760 is made of a glass material, and has the object-side surface 761 and the image-side surface 762 being both spherical.

The seventh lens element 770 with positive refractive power has an object-side surface 771 being convex and an image-side surface 772 being convex. The seventh lens element 770 is made of a glass material, and has the object-side surface 771 and the image-side surface 772 being both spherical.

The eighth lens element 780 with positive refractive power has an object-side surface 781 being convex and an image-side surface 782 being concave. The eighth lens element 780 is made of a glass material, and has the object-side surface 781 and the image-side surface 782 being both spherical.

The filter 790 is made of a glass material and located between the eighth lens element 780 and the image surface 795, and will not affect the focal length of the image capturing optical lens assembly.

The detailed optical data of the 7th embodiment are shown in Table 10 below.

TABLE 10

7th Embodiment
f = 3.67 mm, Fno = 1.50, HFOV = 42.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 6.558 | 0.800 | Glass | 1.770 | 44.1 | −6.13 |
| 2 | | 2.598 | 1.863 | | | | |
| 3 | Lens 2 | −15.029 | 0.619 | Glass | 1.697 | 29.5 | −7.08 |
| 4 | | 7.467 | 0.010 | Cement | 1.502 | 38.8 | |
| 5 | Lens 3 | 7.467 | 1.789 | Glass | 1.993 | 29.1 | 5.00 |
| 6 | | −13.068 | 0.100 | | | | |
| 7 | Ape. Stop | Plano | 0.100 | | | | |
| 8 | Lens 4 | 9.130 | 1.814 | Glass | 1.789 | 40.6 | 5.32 |
| 9 | | −7.088 | 0.010 | Cement | 1.502 | 38.8 | |
| 10 | Lens 5 | −7.088 | 0.600 | Glass | 1.993 | 29.1 | −4.12 |
| 11 | | 10.084 | 0.476 | | | | |
| 12 | Lens 6 | −16.775 | 2.198 | Glass | 1.789 | 40.6 | 9.51 |
| 13 | | −5.482 | 0.100 | | | | |
| 14 | Lens 7 | 32.709 | 1.634 | Glass | 1.789 | 40.6 | 13.11 |
| 15 | | −14.789 | 0.100 | | | | |
| 16 | Lens 8 | 8.596 | 2.787 | Glass | 1.789 | 40.6 | 23.88 |
| 17 | | 13.556 | 1.500 | | | | |
| 18 | Filter | Plano | 0.400 | Glass | 1.509 | 64.2 | — |
| 19 | | Plano | 1.999 | | | | |
| 20 | Image | Plano | — | | | | |

Reference wavelength is 900 nm.
Effective radius of surface 16 is 3.600 mm.

The definitions of these parameters shown in the following table are the same as those stated in the 1st embodiment with corresponding values for the 7th embodiment, so an explanation in this regard will not be provided again. Moreover, these parameters can be calculated from Table 10 as the following values and satisfy the following conditions:

7th Embodiment

| | | | |
|---|---|---|---|
| f [mm] | 3.67 | Td/ΣAT | 5.44 |
| Fno | 1.50 | Td/BL | 3.85 |
| HFOV [deg.] | 42.4 | \|R1\|/R2 | 2.52 |
| FOV [deg.] | 84.8 | Ri/f | 3.69 |
| ImgH/EPD | 1.10 | (f/fs1) + (f/fs2) | 1.42 |
| \|Yi/ImgH\| | 1.17 | \|f/fi\| | 0.15 |
| T12/ΣAT | 0.68 | | |

Moreover, according to the 7th embodiment, at least one lens element of the front lens group has a refractive index greater than 1.90, that is, the third lens element 730; at least one lens element of the rear lens group has a refractive index greater than 1.90, that is, the fifth lens element 750.

8th Embodiment

Figure 15:
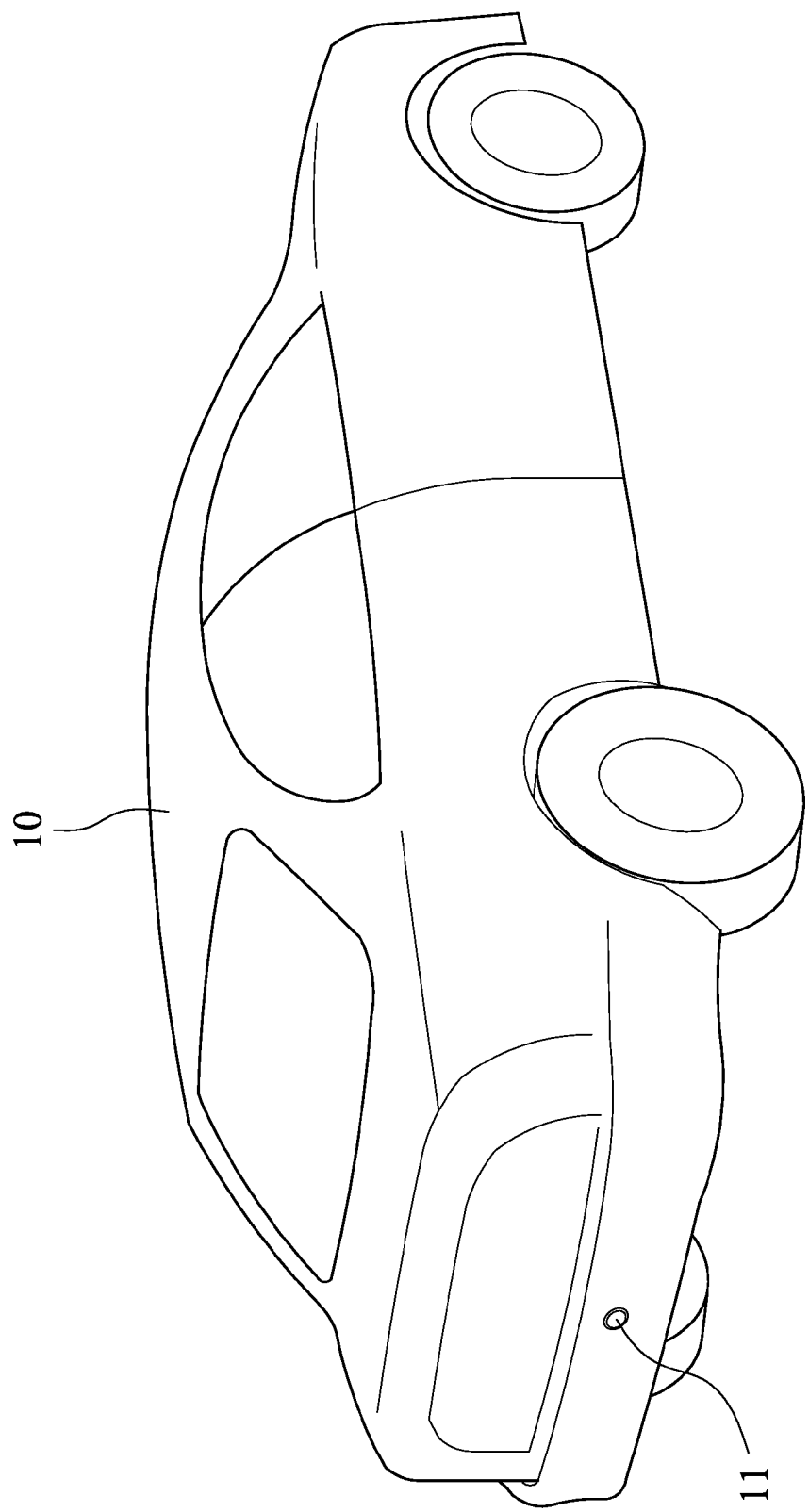
FIG. 15 is a schematic view of an electronic device according to the 8th embodiment of the present disclosure.

FIG. 15 is a schematic view of an electronic device 10 according to the 8th embodiment of the present disclosure. The electronic device 10 of the 8th embodiment is a rear-view camera system, wherein the electronic device 10 includes an image capturing device 11. The image capturing device 11 includes an image capturing optical lens assembly (its reference numeral is omitted) according to the present disclosure and an image sensor (its reference numeral is omitted), wherein the image sensor is disposed on an image surface of the image capturing optical lens assembly.

9th Embodiment

Figure 16:
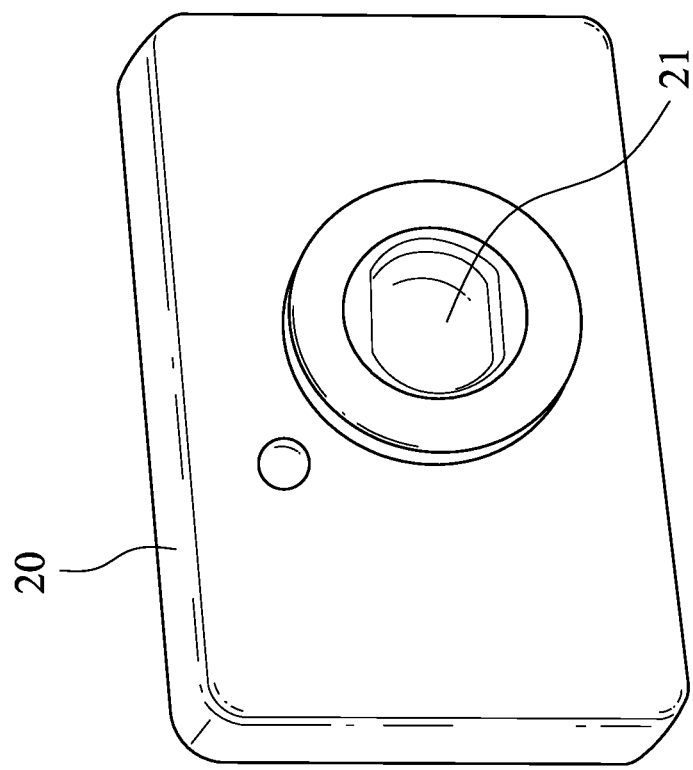
FIG. 16 is a schematic view of an electronic device according to the 9th embodiment of the present disclosure.

FIG. 16 is a schematic view of an electronic device 20 according to the 9th embodiment of the present disclosure. The electronic device 20 of the 9th embodiment is a driving recording system, wherein the electronic device 20 includes an image capturing device 21. The image capturing device 21 includes an image capturing optical lens assembly (its reference numeral is omitted) according to the present disclosure and an image sensor (its reference numeral is omitted), wherein the image sensor is disposed on an image surface of the image capturing optical lens assembly.

10th Embodiment

Figure 17:
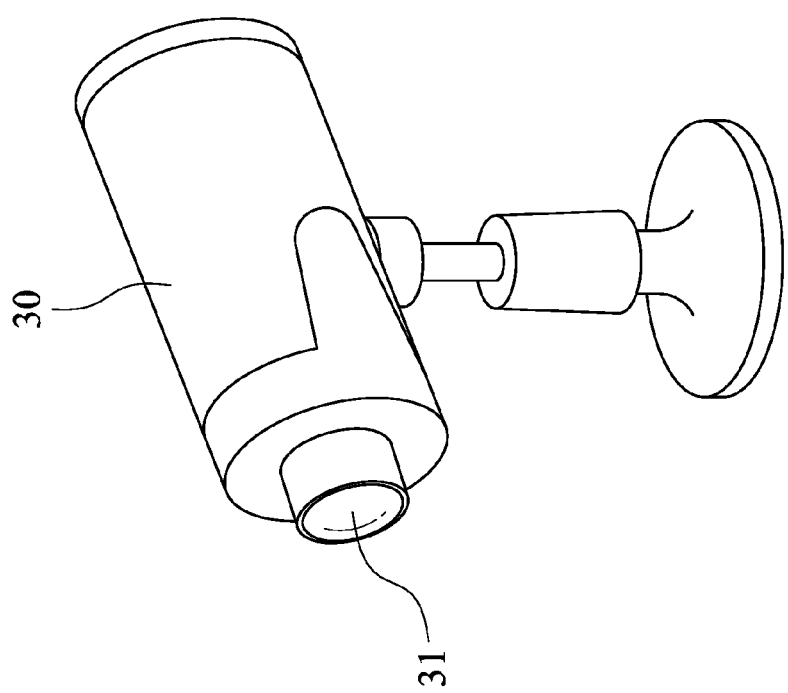
FIG. 17 is a schematic view of an electronic device according to the 10th embodiment of the present disclosure.

FIG. 17 is a schematic view of an electronic device 30 according to the 10th embodiment of the present disclosure.

The electronic device 30 of the 10th embodiment is a surveillance system, wherein the electronic device 30 includes an image capturing device 31. The image capturing device 31 includes an image capturing optical lens assembly (its reference numeral is omitted) according to the present disclosure and an image sensor (its reference numeral is omitted), wherein the image sensor is disposed on an image surface of the image capturing optical lens assembly.

The foregoing description, for purpose of explanation, has been described with reference to specific embodiments. It is to be noted that Tables 1-10 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens assembly comprising, in order from an object side to an image side:
    a front lens group comprising a first lens element and a second lens element at least, in order from the object side to the image side, wherein the first lens element has negative refractive power and an image-side surface being concave, the first lens element is the lens element closest to the object side of the front lens group, and the second lens element is adjacent to the first lens element;
    an aperture stop;
    a rear lens group comprising at least four lens elements, wherein one of the at least four lens elements is a last lens element that has an image side surface being concave, and the last lens element is the lens element closest to the image side of the rear lens group; and
    an image surface;
    wherein the image capturing optical lens assembly has a total of eight lens elements, an axial distance between an object-side surface of the first lens element and the image-side surface of the last lens element is Td, a sum of axial distances between every adjacent lens elements of the image capturing optical lens assembly is ΣAT, an effective radius of the image-side surface of the last lens element is Yi, a maximal image height of the image capturing optical lens assembly is ImgH, a curvature radius of the object-side surface of the first lens element is R1, a curvature radius of the image-side surface of the first lens element is R2, a curvature radius of the image-side surface of the last lens element is Ri, a focal length of the image capturing optical lens assembly is f, and the following conditions are satisfied:

$5.0<Td/\Sigma AT;$ $|Yi/ImgH|<2.0;$ $1.5<|R1|/R2;$ and $0<Ri/f<10.$

2. The image capturing optical lens assembly of claim 1, wherein the focal length of the image capturing optical lens assembly is f, a focal length of the last lens element is fi, and the following condition is satisfied:

$|f/fi|<0.30.$

3. The image capturing optical lens assembly of claim 1, wherein the axial distance between the object-side surface of the first lens element and the image-side surface of the last lens element is Td, the sum of axial distances between every adjacent lens elements of the image capturing optical lens assembly is ΣAT, and the following condition is satisfied:

$5.25<Td/\Sigma AT<10.$

4. The image capturing optical lens assembly of claim 1, wherein the axial distance between the object-side surface of the first lens element and the image-side surface of the last lens element is Td, an axial distance between the image-side surface of the last lens element and the image surface is BL, and the following condition is satisfied:

$3.0<Td/BL<10.$

5. The image capturing optical lens assembly of claim 1, wherein a maximal field of view of the image capturing optical lens assembly is FOV, an f-number of the image capturing optical lens assembly is Fno, and the following conditions are satisfied:

$80\ degrees<FOV;$ and $Fno<2.40.$

6. The image capturing optical lens assembly of claim 1, wherein the front lens group has a total of three lens elements, and the rear lens group has a total of five lens elements.

7. The image capturing optical lens assembly of claim 6, wherein,
    the lens elements of the front lens group comprises, in order from the object side to the image side, the first lens element, the second lens element with negative refractive power and a third lens element with positive refractive power; and
    the lens elements of the rear lens group comprises, in order from the object side to the image side, a fourth lens element with positive refractive power, a fifth lens element with negative refractive power, a sixth lens element with positive refractive power, a seventh lens element with positive refractive power and an eighth lens element being the last lens element.

8. The image capturing optical lens assembly of claim 1, wherein a number of the lens elements having negative refractive power of the rear lens group is one.

9. The image capturing optical lens assembly of claim 1, wherein,
    at least one lens element of the front lens group has an Abbe number smaller than 25; and
    at least one lens element of the rear lens group has an Abbe number smaller than 25.

10. The image capturing optical lens assembly of claim 1, wherein,
    at least one lens element of the front lens group has a refractive index greater than 1.90; and
    at least one lens element of the rear lens group has a refractive index greater than 1.90.

11. The image capturing optical lens assembly of claim 1, wherein the focal length of the image capturing optical lens assembly is f, a focal length of a lens element closest to the aperture stop of the front lens group is fs1, a focal length of a lens element closest to the aperture stop of the rear lens group is fs2, and the following condition is satisfied:

0.80<(f/fs1)+(f/fs2)<2.0.

12. The image capturing optical lens assembly of claim 1, wherein an axial distance between the first lens element and the second lens element is T12, the sum of axial distances between every adjacent lens elements of the image capturing optical lens assembly is ΣAT, and the following condition is satisfied:

0.50<T12/ΣAT<0.85.

13. An image capturing device, comprising:
the image capturing optical lens assembly of claim 1; and
an image sensor, wherein the image sensor is disposed on the image surface of the image capturing optical lens assembly.

14. An electronic device, comprising:
the image capturing device of claim 13.

15. An image capturing optical lens assembly comprising, in order from an object side to an image side:
a front lens group comprising a first lens element and a second lens element at least, in order from the object side to the image side, wherein the first lens element has negative refractive power and an image-side surface being concave, the first lens element is the lens element closest to the object side of the front lens group, and the second lens element is adjacent to the first lens element;
an aperture stop;
a rear lens group comprising at least four lens elements, wherein one of the at least four lens elements is a last lens element that has an object-side surface being convex and an image side surface being concave, and the last lens element is the lens element closest to the image side of the rear lens group; and
an image surface;
wherein the image capturing optical lens assembly has a total of eight lens elements, an axial distance between an object-side surface of the first lens element and the image-side surface of the last lens element is Td, a sum of axial distances between every adjacent lens elements of the image capturing optical lens assembly is ΣAT, an effective radius of the image-side surface of the last lens element is Yi, a maximal image height of the image capturing optical lens assembly is ImgH, a curvature radius of the object-side surface of the first lens element is R1, a curvature radius of the image-side surface of the first lens element is R2, and the following conditions are satisfied:

5.0<Td/ΣAT;

|Yi/ImgH|<2.0; and 1.5<|R1|/R2.

16. The image capturing optical lens assembly of claim 15, wherein a focal length of the last lens element is fi, and |fi| is a largest focal length in absolute value of the lens elements of the image capturing optical lens assembly.

17. The image capturing optical lens assembly of claim 15, wherein the axial distance between the object-side surface of the first lens element and the image-side surface of the last lens element is Td, an axial distance between the image-side surface of the last lens element and the image surface is BL, and the following condition is satisfied:

3.0<Td/BL<10.

18. The image capturing optical lens assembly of claim 15, wherein the maximal image height of the image capturing optical lens assembly is ImgH, an entrance pupil diameter of the image capturing optical lens assembly is EPD, and the following condition is satisfied:

0.80<ImgH/EPD<2.40.

19. The image capturing optical lens assembly of claim 15, wherein a curvature radius of the image-side surface of the last lens element is Ri, a focal length of the image capturing optical lens assembly is f, and the following condition is satisfied:

0.5<Ri/f<5.0.

20. The image capturing optical lens assembly of claim 15, wherein the front lens group has a total of three lens elements, and the rear lens group has a total of five lens elements.

21. The image capturing optical lens assembly of claim 20, wherein,
the lens elements of the front lens group comprises, in order from the object side to the image side, the first lens element, the second lens element with negative refractive power and a third lens element with positive refractive power; and
the lens elements of the rear lens group comprises, in order from the object side to the image side, a fourth lens element with positive refractive power, a fifth lens element with negative refractive power, a sixth lens element with positive refractive power, a seventh lens element with positive refractive power and an eighth lens element being the last lens element.

22. The image capturing optical lens assembly of claim 15, wherein a number of the lens elements having negative refractive power of the rear lens group is one.

23. The image capturing optical lens assembly of claim 15, wherein,
at least one lens element of the front lens group has an Abbe number smaller than 25; and
at least one lens element of the rear lens group has an Abbe number smaller than 25.

24. The image capturing optical lens assembly of claim 15, wherein an axial distance between the first lens element and the second lens element is T12, the sum of axial distances between every adjacent lens elements of the image capturing optical lens assembly is ΣAT, and the following condition is satisfied:

0.50<T12/ΣAT<0.85.

25. An image capturing device, comprising:
the image capturing optical lens assembly of claim 15; and
an image sensor, wherein the image sensor is disposed on the image surface of the image capturing optical lens assembly.

26. An electronic device, comprising:
the image capturing device of claim 25.

* * * * *